United States Patent
Xu et al.

(10) Patent No.: US 11,893,164 B2
(45) Date of Patent: Feb. 6, 2024

(54) METHODS AND SYSTEMS FOR EYES-FREE TEXT ENTRY

(71) Applicant: TRUSTEES OF DARTMOUTH COLLEGE, Hanover, NH (US)

(72) Inventors: Zheer Xu, West Lebanon, NH (US); Jun Gong, West Lebanon, NH (US); Xiaojun Bi, Syosset, NY (US); Xing-Dong Yang, Hanover, NH (US)

(73) Assignee: TRUSTEES OF DARTMOUTH COLLEGE, Hanover, NH (US)

( * ) Notice: Subject to any disclaimer, the term of this patent is extended or adjusted under 35 U.S.C. 154(b) by 0 days.

(21) Appl. No.: 17/768,723

(22) PCT Filed: Oct. 16, 2020

(86) PCT No.: PCT/US2020/055984
§ 371 (c)(1),
(2) Date: Apr. 13, 2022

(87) PCT Pub. No.: WO2021/076889
PCT Pub. Date: Apr. 22, 2021

(65) Prior Publication Data
US 2023/0333669 A1   Oct. 19, 2023

Related U.S. Application Data

(60) Provisional application No. 62/923,059, filed on Oct. 18, 2019.

(51) Int. Cl.
*G06F 3/023* (2006.01)
*G06F 3/02* (2006.01)

(52) U.S. Cl.
CPC .......... *G06F 3/0237* (2013.01); *G06F 3/0202* (2013.01); *G06F 3/0236* (2013.01)

(58) Field of Classification Search
CPC ..... G06F 3/0237; G06F 3/0202; G06F 3/0236
See application file for complete search history.

(56) References Cited

U.S. PATENT DOCUMENTS

| | | | | |
|---|---|---|---|---|
| 8,570,273 | B1 * | 10/2013 | Smith | G06F 3/03547 345/161 |
| 10,139,906 | B1 * | 11/2018 | Bai | G06F 3/014 |

(Continued)

FOREIGN PATENT DOCUMENTS

| CN | 106293128 A | 1/2017 |
|---|---|---|

OTHER PUBLICATIONS

International Search Report and Written Opinion dated Jan. 25, 2021 in PCT/US2020/055984, filed on Oct. 16, 2020, 2 pages.

(Continued)

*Primary Examiner* — Dmitriy Bolotin
(74) *Attorney, Agent, or Firm* — Oblon, McClelland, Maier & Neustadt, L.L.P.

(57) ABSTRACT

The present disclosure relates to a system for eyes-free text entry. The system may include a wearable device having a display and processing circuitry configured to receive a haptic input provided to a keyboard mounted on a finger of a user, the haptic input being an indication of an alphabetical letter, generate a list of candidate words based on the received haptic input, each candidate t word of the list of candidate words being associated with a probability thereof, display the generated list of candidate words to the user via the display of the wearable device, receive a selection of a particular candidate word of the list of candidate words, and append the particular candidate to a present sentence structure, wherein the keyboard has a layout based on a spatial model reflecting spatial awareness, by the user, of key locations on the finger.

20 Claims, 18 Drawing Sheets

(56) References Cited

U.S. PATENT DOCUMENTS

| | | | |
|---|---|---|---|
| 11,733,790 B2* | 8/2023 | Beyhs | G06F 3/038 |
| | | | 345/184 |
| 2003/0214481 A1 | 11/2003 | Xiong | |
| 2004/0036678 A1 | 2/2004 | Zngf | |
| 2007/0268268 A1* | 11/2007 | Allison | G06F 3/014 |
| | | | 345/173 |
| 2008/0010616 A1* | 1/2008 | Algreatly | G06F 3/0362 |
| | | | 345/157 |
| 2009/0096746 A1* | 4/2009 | Kruse | G06F 3/016 |
| | | | 340/407.1 |
| 2011/0007035 A1* | 1/2011 | Shai | G06F 3/0338 |
| | | | 345/179 |
| 2011/0201387 A1* | 8/2011 | Paek | G06F 40/166 |
| | | | 455/566 |
| 2012/0075173 A1* | 3/2012 | Ashbrook | G06F 3/0362 |
| | | | 345/156 |
| 2013/0027341 A1* | 1/2013 | Mastandrea | G06F 3/038 |
| | | | 345/173 |
| 2013/0113709 A1 | 5/2013 | Wine | |
| 2013/0135223 A1* | 5/2013 | Shai | G06F 3/014 |
| | | | 345/173 |
| 2015/0208967 A1* | 7/2015 | Tateda | A61B 5/024 |
| | | | 600/323 |
| 2015/0293592 A1* | 10/2015 | Cheong | G06F 1/163 |
| | | | 345/173 |
| 2017/0003876 A1* | 1/2017 | Marsden | G06F 3/0231 |
| 2017/0108939 A1* | 4/2017 | Chilmulwar | G08C 17/02 |
| 2017/0147138 A1* | 5/2017 | Dow | G06F 1/163 |
| 2018/0052517 A1* | 2/2018 | Bulgarelli | G06F 3/017 |
| 2018/0120891 A1* | 5/2018 | Eim | H04M 1/0235 |
| 2018/0239429 A1* | 8/2018 | Gupta | G06F 3/0346 |
| 2019/0004604 A1* | 1/2019 | Wang | G06F 3/0346 |
| 2021/0096660 A1* | 4/2021 | Xie | G06F 3/04162 |
| 2021/0271364 A1* | 9/2021 | Ghassabian | G06F 3/0237 |
| 2022/0407550 A1* | 12/2022 | Grétarsson | H04B 1/385 |
| 2023/0112944 A1* | 4/2023 | Pargoe | H04W 4/021 |
| | | | 232/38 |

OTHER PUBLICATIONS

Lee et al. "Quadmetric Optimized Thumb-to-Finger Interaction for Force Assisted One-Handed Text Entry on Mobile Headsets", Proc. ACM Interact. Mob. Wearable Ubiquitous Technol., vol. 3, No. 3, Article 94, 2019, 27 pages.

Xu et al. "TipText: Eyes-Free Text Entry on a Fingertip Keyboard", UIST 19, Session 7A text, 2019, 17 pages.

* cited by examiner

FIG. 4A

| QWER | TYUI | OP |
| AS   | DF   | GHJKL |
| ZXCV | BN   | M |

FIG. 4B

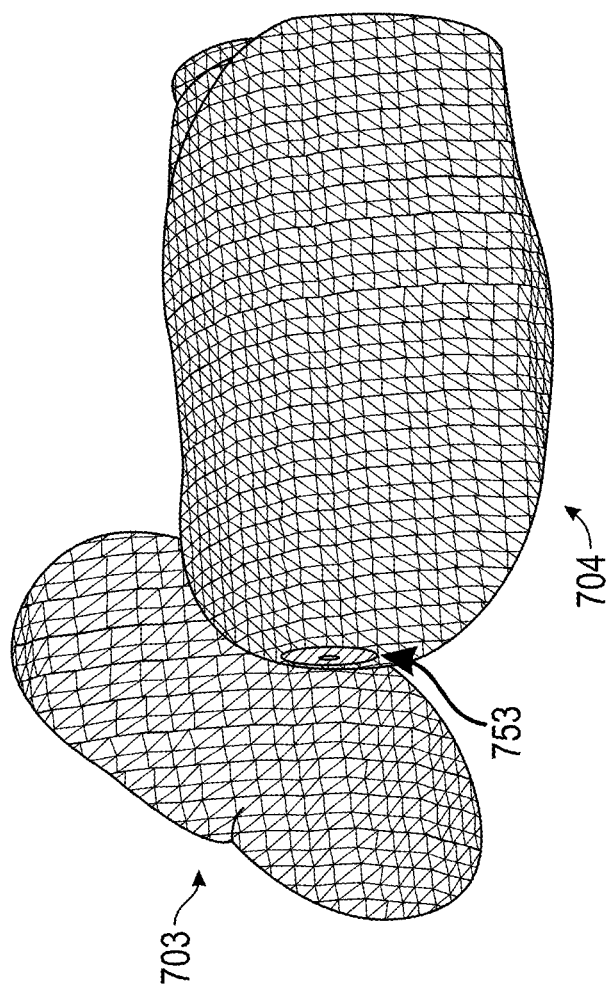

| QWER | TYU | IOP |
|------|-----|-----|
| ASD  | FGH | JKL |
| ZX   | CVB | NM  |

FIG. 10A

| QW | ER | TY  | UI | OP |
|----|----|-----|----|----|
| A  | SD | FGH | JK | I  |
|    | ZX | CVB | NM |    |

FIG. 10B

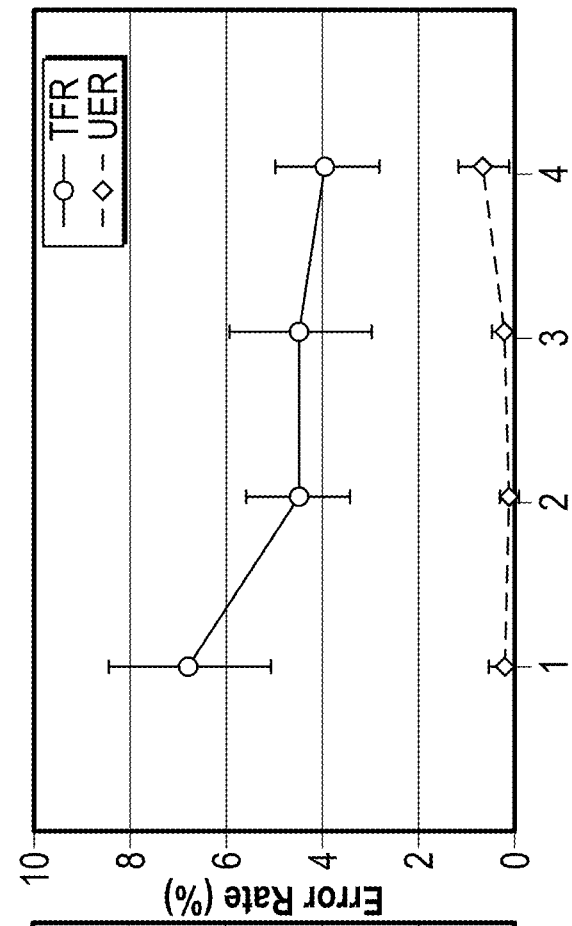
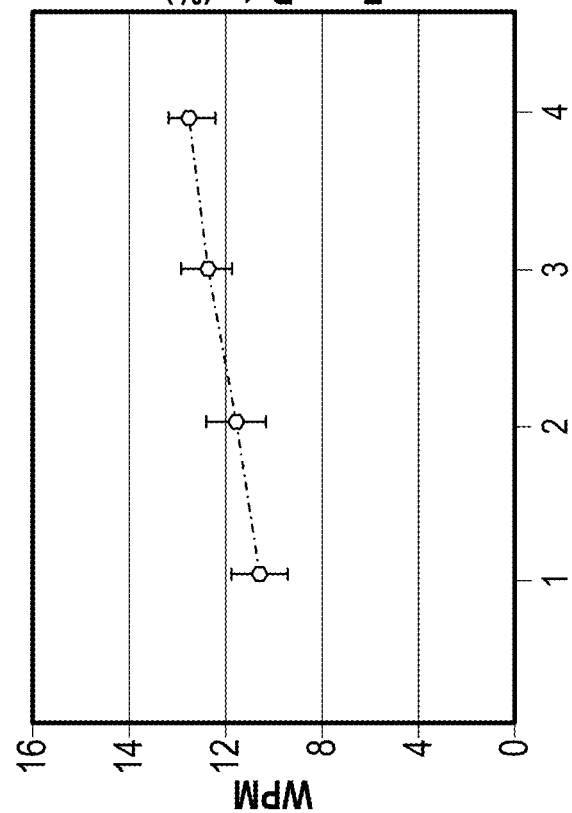
FIG. 12A
FIG. 12B

METHODS AND SYSTEMS FOR EYES-FREE TEXT ENTRY

CROSS-REFERENCE TO RELATED APPLICATIONS

The present application claims priority to U.S. Provisional Application No. 62/923,059, filed Oct. 18, 2019, the teaching of which is incorporated by reference herein in its entirety for all purposes.

BACKGROUND

Field of the Disclosure

The present disclosure relates to finger-tip control of mobile devices and communication.

Description of the Related Art

Appreciating that computing devices are tightly integrated into our daily living and working environments, users often require easy-to-carry and always-available input devices to interact with them in subtle manners.

One-handed micro thumb-tip gestures, for instance, offer new opportunities for fast, subtle, and always-available interactions, particularly on devices with limited input space (e.g., wearables). Very much like gesturing on a trackpad, using the thumb-tip to interact with the virtual world through the index finger is a natural method to perform input, and is made increasingly practical with rapid advances in sensing technologies such as epidermal devices and interactive shin technologies.

While micro thumb-tip gestures have been explored for many application, such as mobile information tasks (e.g., dialing numbers), text entry as an application of micro thumb-tip gestures is often overlooked, despite the fact that text entry comprises approximately 40% of mobile activity. Moreover, using the thumb-tip for text entry on the index finger offers several potential benefits. First, text input can be carried out using one hand, which may be important in mobile scenarios, where the other hand may be occupied by a primary task. Second, text input can be carried out unobtrusively, which can be useful in social scenarios, such as in a meeting where alternative solutions, like texting on a device (e.g., smartphone or watch) or using speech, may be socially inappropriate or prone to compromising privacy of a user. Third, text input can be carried out without a requirement to visually observe the keyboard and the keystrokes performed thereon. Such an 'eyes-free' environment may lead to better performance than eyes-on input while saving screen real estate for devices.

However, despite these potential benefits, implementation of eyes-free text entry approach is challenging because of a lack of input space, missing proper haptic feedback, and lack of a flat and rigid surface on an index finger, for instance. To this end, a QWERTY keyboard can barely be laid out on the index finger and the keys can be too small to type. Unlike a physical keyboard, typing on the index finger offers little useful haptic feedback to inform the user about which key was selected, making it more difficult for eyes-free typing. This is to say nothing of curved and soft nature of the tip of the index finger, which may impact tapping accuracy on what are already small "keys".

Accordingly, a one-handed text entry technique designed for enabling thumb-tip tapping while addressing the above-described shortcomings is needed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a method and systems for eyes-free text entry.

In an embodiment, the present disclosure further relates to a system for eyes-free text entry, comprising a wearable device having a display, and processing circuitry configured to receive a haptic input provided to a keyboard mounted on a finger of a user, the haptic input being an indication of an alphabetical letter determined based on a location of the haptic input on the keyboard, generate a list of candidate words based on the received haptic input, each candidate word of the list of candidate words being associated with a probability thereof, display the generated list of candidate words to the user via the display of the wearable device, receive a selection of a particular candidate word of the list of candidate words, and append the particular candidate word of the list of candidate words corresponding to the received selection to a present sentence structure, wherein the keyboard has a layout based on a spatial model reflecting spatial awareness, by the user, of key locations on the finger.

In an embodiment, the processing circuitry is configured to calculate the probability associated with each candidate word of the list of candidate words by generating a probability based on an application of the spatial model to the received haptic input, the spatial model describing a relationship between touch locations of the user and locations of keys of the keyboard, generating a probability based on an application of a language model to the received haptic input, the language model providing probability distributions of a sequence of words for a given language, and combining the generated probability based on the application of the spatial model and the generated probability based on the application of the language model to generate the probability associated with each candidate word of the list of candidate words.

According to an embodiment, the present disclosure further relates to a method of eyes-free text entry, comprising receiving, by processing circuitry, a haptic input provided to a keyboard mounted on a finger of a user, the haptic input being an indication of an alphabetical letter determined based on a location of the haptic input on the keyboard, generating, by the processing circuitry, a list of candidate words based on the received haptic input, each candidate word of the list of candidate words being associated with a probability thereof, displaying, by the processing circuitry, the generated list of candidate words to the user via a display of a wearable device, receiving, by the processing circuitry, a selection of a particular candidate word of the list of candidate words, and appending, by the processing circuitry, the particular candidate word of the list of candidate words corresponding to the received selection to a present sentence structure, wherein the keyboard has a layout based on a spatial model reflecting spatial awareness, by the user, of key locations on the finger.

According to an embodiment, the present disclosure further relates to an apparatus for eyes-free text entry, comprising processing circuitry configured to receive a haptic input provided to a keyboard mounted on a finger of a user, the haptic input being an indication of an alphabetical letter determined based on a location of the haptic input on the keyboard, generate a list of candidate words based on the received haptic input, each candidate word of the list of candidate words being associated with a probability thereof, display the generated list of candidate words to the user via a display of a wearable device, receive a selection of a particular candidate word of the list of candidate words, and append the particular candidate word of the list of candidate words corresponding to the received selection to a present sentence structure, wherein the keyboard has a layout based on a spatial model reflecting spatial awareness, by the user, of key locations on the finger.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A is an illustration of potential layouts of a keyboard implemented within a system for eyes-free one-handed text entry, according to an exemplary embodiment of the present disclosure;

FIG. 4B is an illustration of layout of a keyboard implemented within a system for eyes-free one-handed text entry, according to an exemplary embodiment of the present disclosure;

FIG. 7 is a rendering of a three-dimensional touch simulation of two intersected fingers, according to an exemplary embodiment of the present disclosure;

FIG. 10A is an illustration of a layout of a keyboard implemented within a system for eyes-free one-handed text entry, according to an exemplary embodiment of the present disclosure;

FIG. 10B is an illustration of a layout of a keyboard implemented within a system for eyes-free one-handed text entry, according to an exemplary embodiment of the present disclosure;

FIG. 12A is a graphical illustration of text entry speed across four blocks, according to an exemplary embodiment of the present disclosure;

FIG. 12B is a graphical illustration of text entry error rate across four blocks, according to an exemplary embodiment of the present disclosure;

DETAILED DESCRIPTION

Figure 1A:
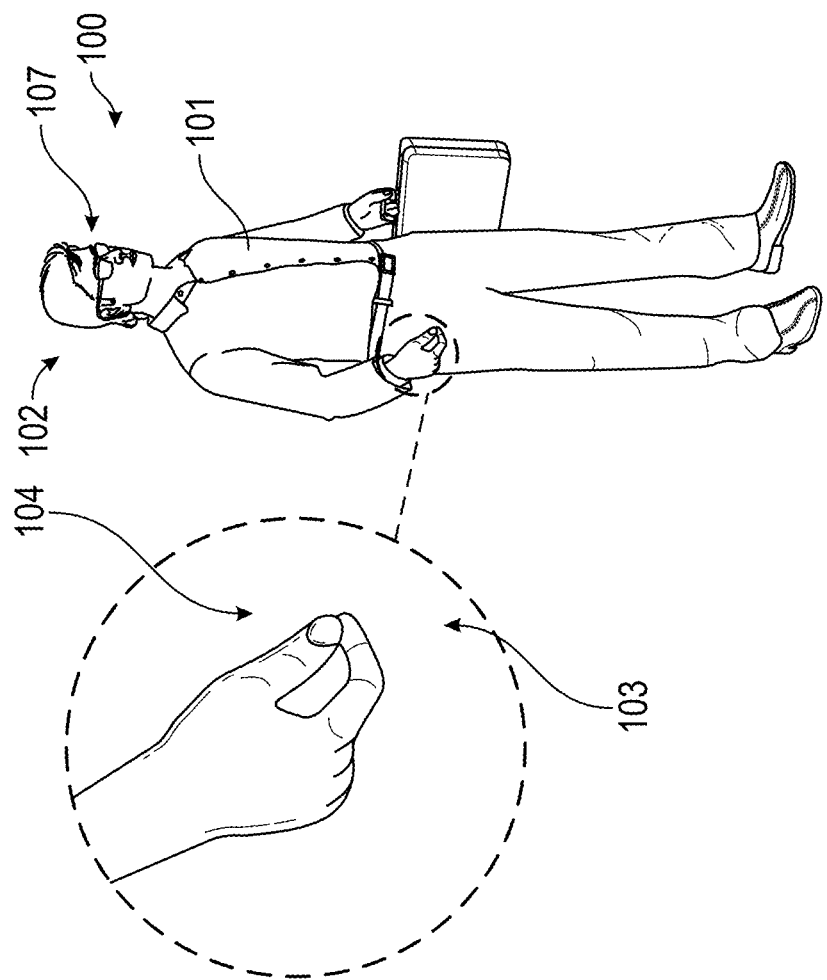
FIG. 1A is an illustration of an aspect of a system for eyes-free one-handed text entry, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

There have been a number of techniques proposed to facilitate input performed with hand gestures and finger gestures. Various sensing approaches have been introduced for input recognition, including camera-based approaches, bio-acoustic approaches, and electromyography-based approaches, among others. Such approaches have been shown effective in the detection of hand gestures (e.g. fist, hand waving, finger tap on skin) and pinching motions (e.g. thumb touching other fingers). Hand gestures can also be sensed using electrical impedance tomography and pressure sensors on the wrist and on the arm.

A common approach for text-entry is based on gestures. For example, a continuous stroke can be used to enter a letter or a word. Alternatively, a single letter can be entered using several discrete strokes or taps. Other commonly applied techniques include non-visual text entry where the user has no visual access to the keyboard. However, these approaches are often focused on enabling novel text entry schemes for visually impaired users or for touch-screen devices where screen real-estate is considerably larger than that of a finger-tip.

Text entry on wearable devices is a considerable challenge, appreciating that input space is, with respect to a QWERTY keyboard with 26 keys, relatively constrained. In an effort to address this challenge, a variety of techniques, such as two-step key selection, have been explored. Most two-step key selection approaches, however, require the use of two hands and use finger touch as an input modality.

Meanwhile, one-handed text entry in wearables introduces a path forward. For instance, one approach to one-handed text entry may utilize one dimensional handwriting with a unistroke gesture, while another approach may propose a two-step typing method on a smart glass touchpad. Still, another approach may rely on thumb-to-fingers touch on a T9 keyboard mapped on finger segments providing haptic feedback.

However, the above approaches leave a gap in adequately addressing eyes-free text entry on wearable devices. Accordingly, the present disclosure describes: (1) a spatial model workable with thumb-tip tapping on a fingertip surface (e.g. interactive skin) and (2) an optimized keyboard layout design for TipText. The results of a user study implementing TipText will then be evaluated.

As introduction, the following factors can be considered in designing an eyes-free text entry method using micro thumb-tip gestures.

First, three types of learnability can be considered: (1) learnability of input technique; (2) learnability of keyboard layout; and (3) learnability of eyes-free text entry. As it relates to (1) input techniques for text entry, several techniques including tap, directional swipe, and whirling the wrist may be deployed. Learnability also varies among different input techniques. For example, tapping keys is easy to learn but swiping directionally requires more effort. In general, letter-based text entry methods require less learning effort than word-based methods but trade-offs may exist between learnability and efficiency. For example, letter-based input methods can be slower in entering text. In view of the above, the present disclosure describes key tapping for letter-based text entry to exploit rapid learning. Moreover, various types of keyboard designs exist, including, among others, those following an alphabetical order or a QWERTY layout. With respect to (2) the learnability of keyboard layout QWERTY is relatively easy to learn due to its wide adoption. Therefore, QWERTY is employed within the present disclosure. Further to the above, the present disclosure considers preserving the spatial layout of the letters to minimize learning. As it relates to (3) eyes-free typing, the adoption of tapping and a QWERTY layout minimizes the learning curve of a new user. It can be appreciated that, when typing in an eyes-free context, the imaginary location of a desired key, according to a user and based on their spatial awareness, can be different from the actual location of the key. Thus, the user needs to learn the mapping of each key and to practice in order to develop corresponding kinesthetic memory. Through implementation of eyes-free typing through a system that adopts a spatial model of collected eyes-free input on the index finger, this learning curve is lessened.

Second, and in addition to the above learnability factors, two types of eyes-free conditions can be considered: (1) typing without looking at finger movements and (2) typing without looking at the keyboard. Since a user input space is different from a user output space, it is important to free the visual attention of the user from the fingers as regularly switching attention between where they type and where the output is may introduce significant cognitive overhead and lead to reduced performance. The visual appearance of the keyboard should also be avoided since the screen, if it exists on a very small wearable device (e.g., smartwatch or head-worn display), may be very small. Therefore, screen real estate should be dedicated to the text entered by the user rather than the keyboard. Of course, on devices without a screen, the entered text can be provided via audio using a wireless headphone. In view of the above, eyes-free text input can allow for common activities of daily living and mobile scenarios such as walking with the hand hanging along the body. In general, precise eyes-free input is challenging, especially on the small fingertip. This challenge can be overcome through careful design of keyboard layout, taking into consideration the models of both input language and natural spatial awareness of each user.

Lastly, two types of accuracy can be considered: (1) accuracy of input technique and (2) accuracy of text entry method. With respect to the accuracy of input technique (e.g., tapping precision), it can be hard to precisely locate contact on the small input space of the index finger because of the so-called "fat finger" issue. However, input does not have to be 100% accurate. Certain amounts of tapping errors can be tolerated using a statistical decoder. The efficiency of a letter-based text entry method is mostly related to word disambiguation. This issue appears when more than one letter is associated with an enlarged key (e.g., T9) because it is hard to tell which letter the user wants to enter. Therefore, a balance needs to be struck between key size and word disambiguation.

According to an embodiment, and in view of the above, the present disclosure describes a system, apparatus, and methods for eyes-free text entry using micro thumb-tip gestures. The technique features a miniature QWERTY keyboard residing invisibly on a first segment of an index finger of a user. Text entry can be carried out using a thumb-tip to tap the tip of the index finger of the user. The keyboard layout can be optimized for eyes-free text input by utilizing a spatial model of the keyboard that reflects natural spatial awareness, by a user, of key locations on the index finger.

The system, apparatus, and methods of the present disclosure incorporate results of a series of user studies and computer simulated text entry tests that consider over 1,146,484 possible designs. In an embodiment, the present disclosure describes a grid with letters highly confined to the alphabetic and spatial arrangement of a QWERTY keyboard. In an example, the grid is a two row by three column grid including the alphabetic arrangement and spatial arrangement of the QWERTY keyboard. In a preliminary analysis, micro thumb-tip gestures, implemented according to the system, apparatus, and methods described herein, achieved an average text entry speed of 11.9 words per minute (WPM), with improved typing as fast as 13.3 WPM with increasing user-equipment familiarity.

Referring now to the Figures, a system for eyes-free text entry using micro thumb-tip gestures is described. The system of the present disclosure, which may be referred to herein as the TipText system, and may be considered in view of an apparatus performing similar methods, includes a one-handed text entry technique designed for enabling thumb-tip tapping on a miniature fingertip keyboard.

Figure 1B:
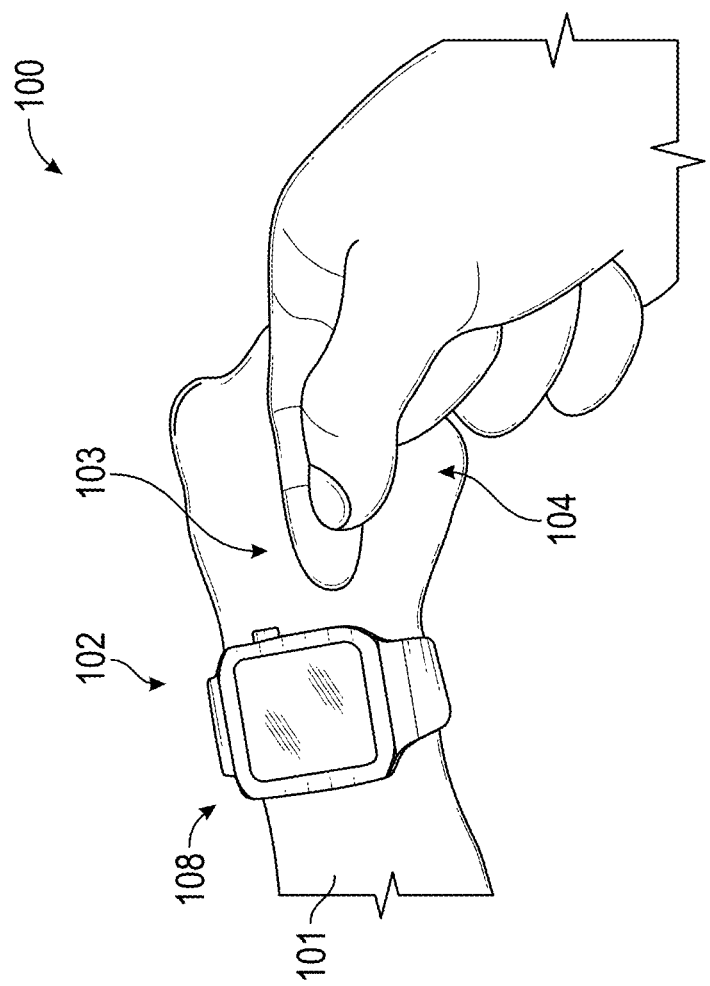
FIG. 1B is an illustration of an aspect of a system for eyes-free one-handed text entry, according to an exemplary embodiment of the present disclosure.

As shown in FIG. 1A, a TipText system 100 can include a wearable 102, such as smart glasses 107, and a fingertip keyboard positioned on an index finger 103 of a user 101 and apposing a thumb 104 of the user 101. As shown in FIG. 1B, a TipText system 100 can include a wearable 102, such as smart watch 108, and a fingertip keyboard positioned on an index finger 103 of a user 101 and apposing a thumb 104 of the user 101. For each of FIG. 1A and FIG. 1B, the wearable 102 may be in wired or wireless communication with the fingertip keyboard positioned on the index finger 103 of the user 101 and apposing the thumb 104 of the user 101. Moreover, the wearable 102 may provide, in a realistic implementation of the TipText system, computational resources for processing received haptic inputs from the user 101.

In embodiment, and with reference to either of FIG. 1A or FIG. 1B, the TipText system 100 can include a miniature QWERTY keyboard that resides invisibly on a first segment (e.g. distal phalanx) of the index finger 103 of the user 101. When typing in an eyes-free context, the user 101 can interact with each "key" based on, in view of the QWERTY keyboard, natural spatial awareness of the location of the desired "key". The received haptic signal, which may include an indication of one letter or a plurality of successive letters, can then be processed by circuitry of the TipText system 100 and used in order to direct a corresponding word search within a dictionary. The search can reveal words corresponding to the sequence of the selected "key" or "keys" and then provide a list of candidate words that likely match the haptic input from the user 101. The list of candidate words can then be displayed to the user 101, via a display of the wearable 102, as a ranked list according to calculated probability of each candidate word. The calculated probability for each candidate word can be determined by a statistical decoder. During implementation of the TipText system 100, the displayed ranked list of candidate words can then be evaluated by the user 101 during a word selection mode to determine which one accurately matches the intended word. In an embodiment, the user 101 may use swiping motions to indicate the accuracy of a candidate word. For instance, the user 101 may swipe the thumb across the QWERTY keyboard on the index finger 103 in order to enter the selection mode. In an example, the selection mode can be entered by swiping right across the QWERTY keyboard on the index finger 103. In the selection mode, the user 101 can determine whether the present candidate word, or in the case of the initial candidate word, the highest ranked candidate word, is the intended word. If the user 101 determines the present candidate word is the intended word, the user 101 can proceed with the next word in a sentence, tapping 'keys' of the QWERTY keyboard on the index finger 103 that corresponding to a subsequent intended word of the sentence. In an embodiment, a space will be automatically inserted after the present candidate word becomes 'committed' by user tapping of the subsequent intended word. If, alternatively, the user 101 determines the present candidate word is not the intended word, the user 101 can, again, swipe across the QWERTY keyboard on the index finger 103 in order to summon the next candidate word from the ranked list of candidate words. In an example, the next candidate word can be summoned by swiping right across the QWERTY keyboard on the index finger 103.

In an embodiment, the user 101 may be able to enter the word selection mode, and thus indicate a present haptic input session is complete, by swiping across the QWERTY keyboard on the index finger 103 in a specific manner. This indicates haptic input related to a given word of a sentence is complete.

In an embodiment, auto-complete may be implemented within the TipText system 100, wherein the user 101 may be enabled to select a desired word from the candidate list of words without having to enter all of the letters of the intended word.

Moreover, in an embodiment, the user 101 may be able to erase an entered letter by swiping across the QWERTY keyboard on the index finger 103. In an example, entered letters may be erased by swiping left across the QWERTY keyboard on the index finger 103.

Figure 2:
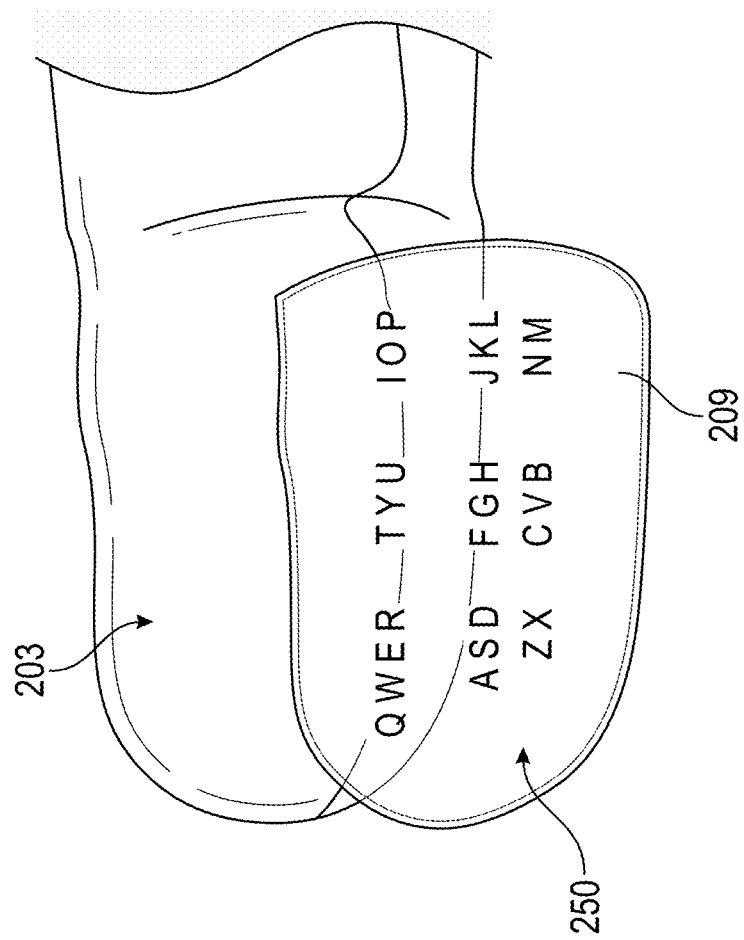
FIG. 2 is a cartoon rendering of a keyboard implemented within a system for eyes-free one-handed text entry, according to an exemplary embodiment of the present disclosure.

According to an embodiment, the QWERTY keyboard on the index finger of the user may be arranged within a grid. As shown in FIG. 2, a QWERTY keyboard 209 may be arranged in, for instance, a three column by three column grid 250 and may reside invisible on a first segment of an index finger 203 of a user. Though the QWERTY keyboard 209 of FIG. 2 is exemplary, it can be appreciated that a keyboard layout implemented within a TipText system of the present disclosure can be optimized for eyes-free input by utilizing a spatial model reflecting natural spatial awareness of a user as it relates to 'key' locations on the index finger 203. In this way, user learning of eyes-free typing can be accelerated.

According to an embodiment, the QWERTY keyboard described with reference to FIG. 2 can be implemented in a variety of ways, as exemplified in FIG. 3A through FIG. 3C. Generally, a QWERTY keyboard 309 can be actualized within an interactive skin 352. The interactive skin 352 may be thin and flexible and include a contact surface 351 having a surface area. The surface area of the contact surface 351 may be, in an example, ~2 cm×~2 cm, but can be generally appreciated as any area corresponding to an anticipated size and shape of a finger of a user. The contact surface 351 of the interactive skin 352 may feature, as a grid 350 thereon, a touch sensor matrix. The touch sensor matrix may be a 3×3 capacitive touch sensor matrix, as an example of a tactile sensor. The touch sensor matrix may feature diamond shaped electrodes. In an example, the diamond shaped electrodes may be of 5 mm diameter and arranged with 6.5 mm center-to-center spacing. Of course, the selection of a diamond shaped electrode is merely arbitrary, as any shaped electrode may be implemented herein. Moreover, the sizing and spacing of the electrodes is dictated by specific constraints of the keyboard design and a statistical decoder used in processing haptic input, and should be considered dynamic across implementations.

Figure 3A:
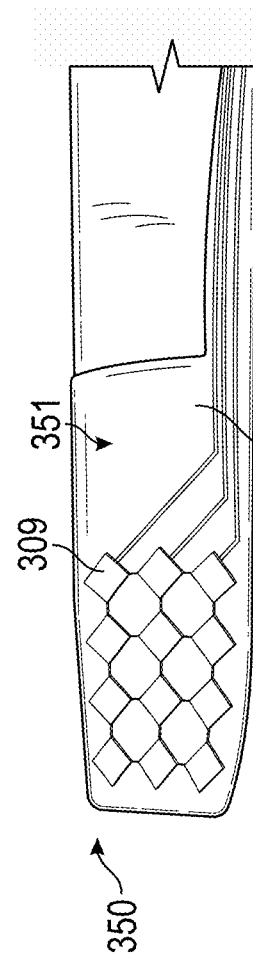
FIG. 3A is an image of a keyboard implemented within a system for eyes-free one-handed text entry, according to an exemplary embodiment of the present disclosure.

Specifically, and as in FIG. 3A, the interactive skin 352 may be a polyethylene terephthalate film refined by a conductive inkjet printing process. An inkjet printer may be filled with, as the conductive ink, a silver nanoparticle ink and the electrodes of a grid 350 may be generated therefrom. In an example, the inkjet printer may be a Canon IP100 desktop inkjet printer and the conductive silver nanoparticle ink may be Mitsubishi NBSIJ-MU01 ink.

Figure 3B:
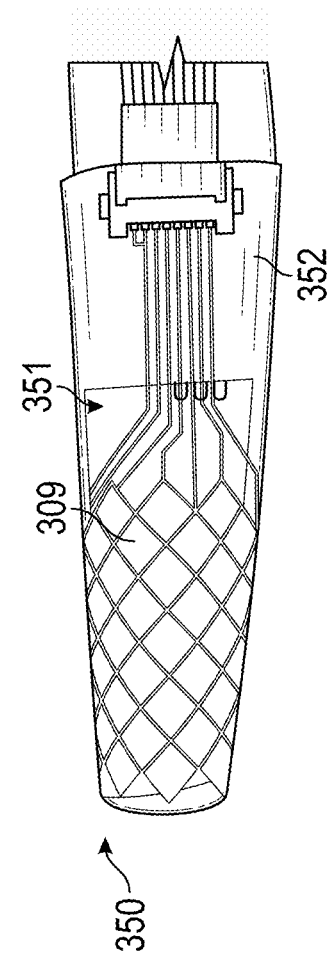
FIG. 3B is an image of a keyboard implemented within a system for eyes-free one-handed text entry, according to an exemplary embodiment of the present disclosure.

As in FIG. 3B, the interactive skin 352 may be a flexible printed circuit. In an example, the flexible printed circuit measured 0.025 mm to 0.125 mm thick and 21.5 mm×27 mm wide.

Figure 3C:
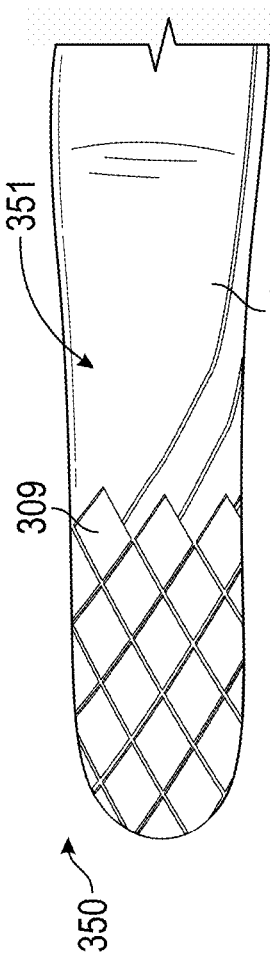
FIG. 3C is an image of a keyboard implemented within a system for eyes-free one-handed text entry, according to an exemplary embodiment of the present disclosure.

As in FIG. 3C, a highly conforming version of the interactive skin 352 was generated. The interactive skin 352 of FIG. 3C was fabricated on temporary tattoo paper. Conductive traces were then screen printed onto the temporary tattoo paper using silver ink overlaid with poly(3,4-ethylenedioxythiphene) polystyrene sulfonate (PEDOT: PSS). A layer of resin binder was then printed between electrode layers to electrically isolate each one. In an embodiment, two layers of temporary tattoos can be applied in order to isolate the sensor from the skin. In an example, the sliver ink is obtained from Gwent (ID#C2130809D5), the PEDOT:PSS is obtained from Gwent (ID#C2100629D1), and the resin binder is obtained from Gwent OW R2070613P2).

According to an embodiment, the interactive skins described above are components of the TipText system and can be in electrical communication with processing circuitry of the TipText system. Accordingly, the processing circuitry of the TipText system can include, at least, a tactile sensor for receiving haptic inputs from the user via the interactive skin.

Figure 4A:
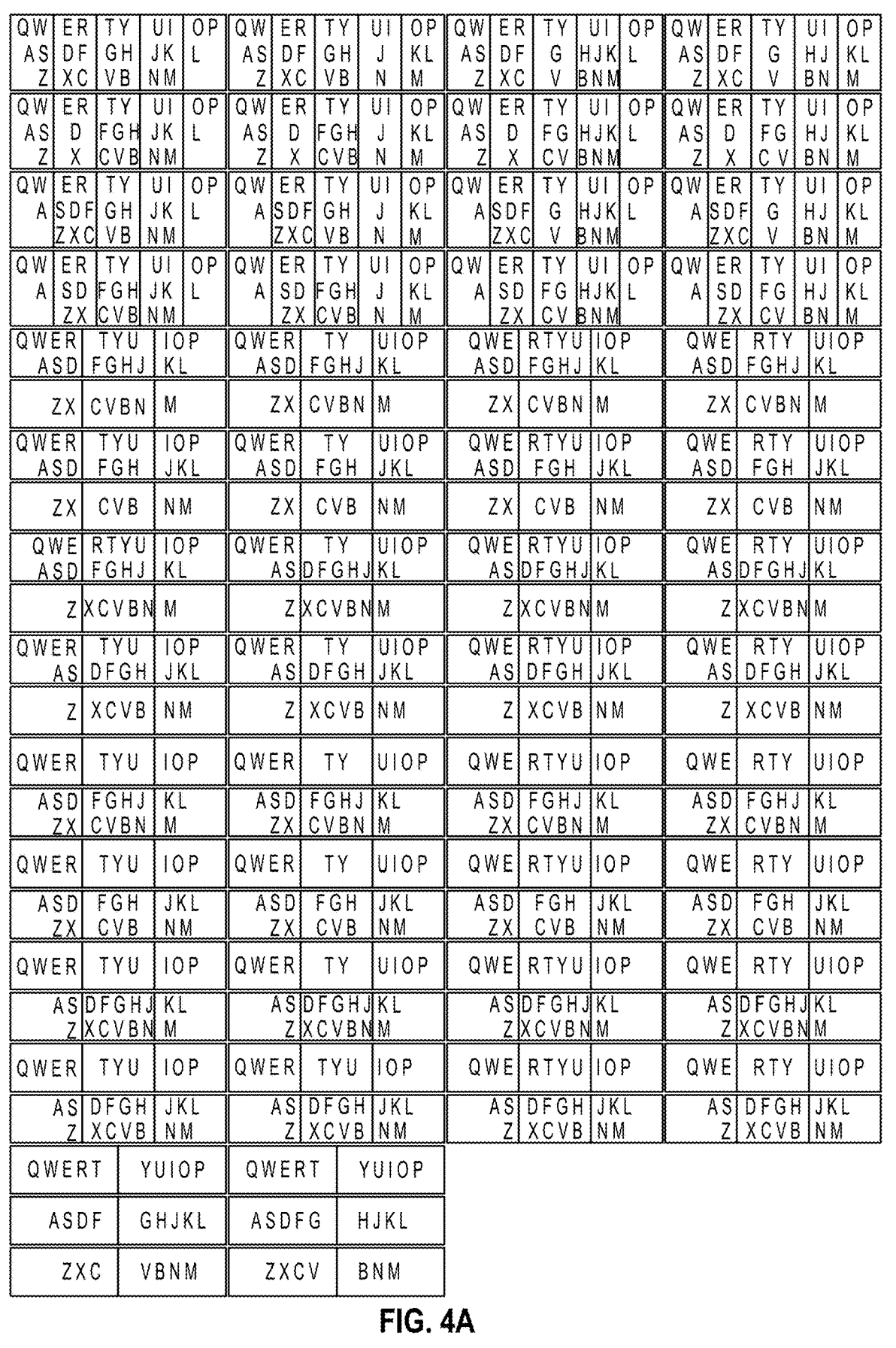
Figure 4B:
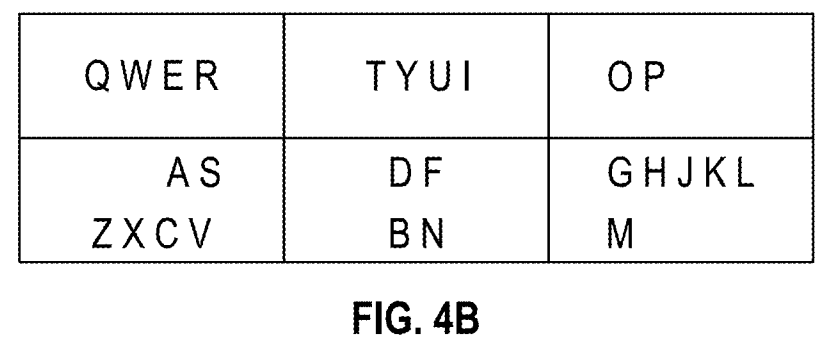

According to an embodiment, a QWERTY keyboard of the interactive skin of the TipText system can employ any number of arrangement combinations of the "keys" therein. For instance, FIG. 4A provides a non-limiting illustration of a plurality of QWERTY keyboard layouts that can be implemented. FIG. 4A includes 16 possible keyboard layouts of a 1×5 grid, 32 possible keyboard layouts of a 2×3 grid, and 2 possible keyboard layouts of a 3×2 grid. In an example, the exemplary QWERTY keyboard layout of FIG. 4B is a 2×3 grid that scored highly when evaluated by a language model.

Figure 5A:
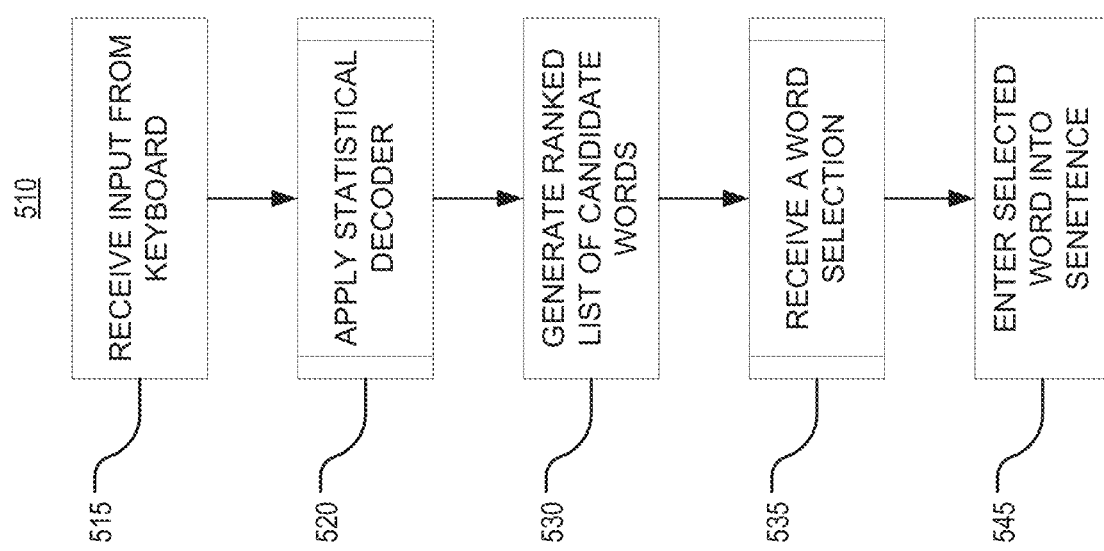
FIG. 5A is a flow diagram of a method of implementing a system for eyes-free one-handed text entry, according to an exemplary embodiment of the present disclosure.

Equipped with the above-described TipText system, a user may interact with the TipText system according to method 510 of FIG. 5A. Steps of method 510 are described as performed by processing circuitry of an apparatus that processes data signals from the interactive skin and controls an output to an user display. In an embodiment, the apparatus may be a wearable device of a user. To this end, the methods described herein may be performed by the wearable device of the user and may be a software application downloadable thereto.

At step 515 of method 510, user input can be received from a keyboard of an interactive skin of the TipText system. Haptic inputs of the user can be transduced by a tactile sensor and can be received by processing circuitry configured to implement a statistical decoder to interpret the haptic inputs.

In an embodiment, an in order to indicate that a haptic input session is complete, the user may perform a specific motion or other action on the QWERTY keyboard. For example, the specific motion may be a swipe across the QWERTY keyboard and the action may indicate that the user is ready for a word selection mode, or selection mode.

At sub process 520 of method 510, the statistical decoder can be applied to the input received from the keyboard during the haptic input session. As will be described with reference to FIG. 5B, application of the statistical decoder includes application of a spatial model and a language model to generate a list of candidate words that may be an intended word input by the user.

At step 530 of method 510, the list of candidate words generated at sub process 520 of method 510 can be ranked according to probabilities associated with each candidate word of the list of candidate words. In an example, the probabilities reflect the likelihood that the candidate word is the word intended by the user.

At sub process 535 of method 510, the ranked list of candidate words can be displayed to the user and a user selection of the intended word can be made during word selection mode. In the case of a wearable device, the ranked list of candidate words can be displayed to the user via a display of the wearable device. The selection of the intended word includes tactile interaction by the user with the QWERTY keyboard of the TipText system and instruction regarding candidate words of the ranked list of candidate words. Sub process 535 of method 510 will be described in greater detail with respect to FIG. 5C.

The word selected at sub process 535 of method 510 can then be entered into a sentence being formed by the user at step 545 of method 510.

Figure 5B:
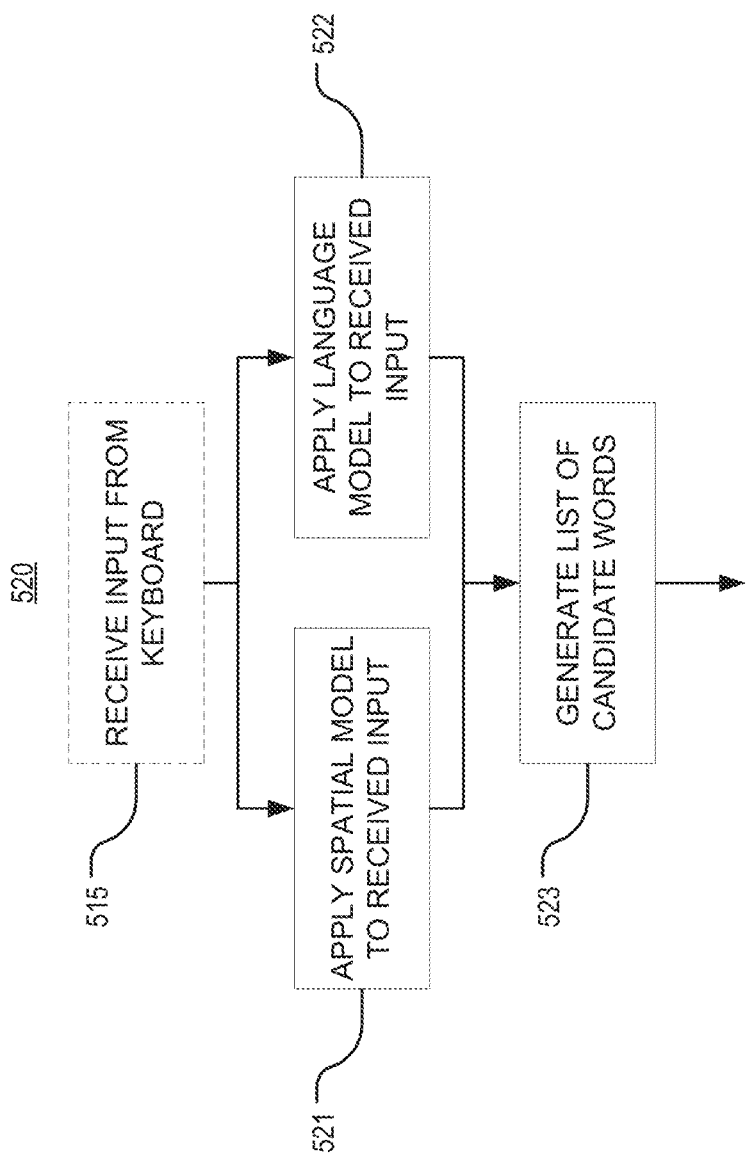
FIG. 5B is a flow diagram of a sub process of a method of implementing a system for eyes-free one-handed text entry, according to an exemplary embodiment of the present disclosure.
Figure 5C:
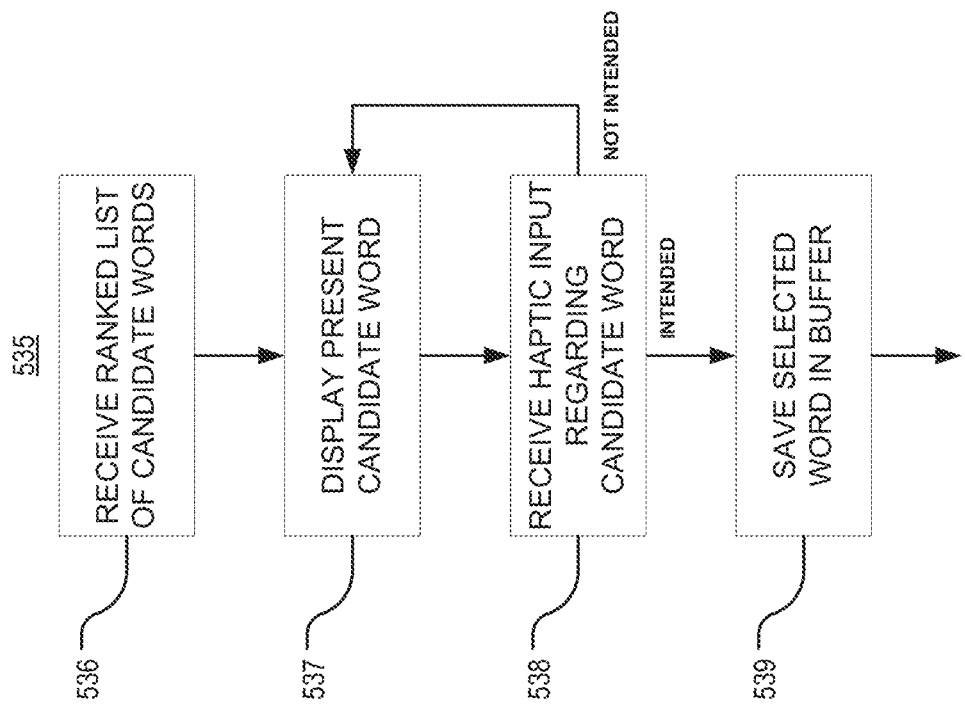
FIG. 5C is a flow diagram of a sub process of a method of implementing a system for eyes-free one-handed text entry, according to an exemplary embodiment of the present disclosure.

According to an embodiment, sub process 520 of method 510 will now be described with reference to FIG. 5B. As noted in FIG. 5A, keyboard input from the user can be received at step 515 of method 510. The keyboard input can be a series of taps corresponding to an intended word. In the event auto-complete is not engaged, or as a complement thereto, the keyboard input may also be a specific tactile action indicating the user has completed a present haptic input session. The received keyboard input can then be evaluated by a statistical decoder, as introduced above. The statistical decoder includes a spatial model, which describes, as a probability, a relationship between touch locations of a user on the QWERTY keyboard and real locations of keys on the QWERTY keyboard, and a language model, which provides probability distributions of a sequence of words for a given language. In an example, the given language is the English language. Accordingly, the spatial model of the statistical decoder may be applied to the received input at step 521 of sub process 520 and the language model of the statistical decoder may be applied to the received input, simultaneously, at step 522 of sub process 520.

In an embodiment, and upon entry of a series of letters by a user, the statistical decoder of sub process 520 of method 510 combines probabilities generated by each of the spatial model and the language model at step 521 and step 522, respectively. The statistical decoder then generates an overall probability of a word according to Bayes' theorem. In this way, the statistical decoder generates a list of candidate words, at step 523 of sub process 520, which can be ranked by overall probability. As described with respect to step 530 of method 510, a higher ranking of a candidate word indicates less ambiguity issues the input presented to the TipText system.

Moreover, and according to an embodiment of the present disclosure, the statistical decoder finds a word W* in lexicon L for a given set of touch points on the keyboard S=[1 . . . , sn . . . , sn] that satisfies:

$$W^* = \underset{W \in L}{\operatorname{argmax}} P(W \mid S) \tag{1}$$

From the Bayes' rule, $$P(W|S) = \frac{P(S|W)P(W)}{P(S)} \quad (2)$$

Since P(S) is an invariant across words, Equation (1) can be converted to $$W^* = \underset{W \in L}{\operatorname{argmax}} P(S|W)P(W) \quad (3)$$

where P(W) is obtained from a language model and P(S|W) is obtained from a spatial model, which can be calculated according to the following approach.

Assuming that W is comprised of n letters: $c_1$, $c_2$, $c_3$, ..., $c_n$, S has n touch points, and each tap is independent, P(S|W) can be described as $$P(S|W) = \prod_{i=1}^{n} P(s_i|c_i) \quad (4)$$

It can be assumed that touch points for text entry using TipText follow a similar pattern as text entry on a touchscreen. Therefore, if the coordinates of $s_i$ are $(x_i, y_i)$, $P(s_i|c_i)$ can be calculated using a bivariate Gaussian distribution as $$P(s_i|c_i) = \frac{1}{2\pi\sigma_{ix}\sigma_{iy}\sqrt{1-\rho_i^2}} \exp\left[-\frac{z}{2(1-\rho_i^2)}\right] \quad (5)$$

where $$z \equiv \frac{(x_i - \mu_{ix})^2}{\sigma_{ix}^2} - \frac{2\rho_i(x_i - \mu_{ix})}{\sigma_{ix}\sigma_{iy}} + \frac{(y_i - \mu_{iy})^2}{\sigma_{iy}^2} \quad (6)$$

, $(\mu_{ix}, \mu_{iy})$ is the center of the touch point distribution aimed on key and $c_i$, $\sigma_{ix}$ and $\sigma_{iy}$ are standard deviations, and $\rho_i$ is the correlation.

Separately, and as it relates to auto completion of words, the TipText system assumes that users generate no insertion and omission errors and each 'key' is tapped independently. Thus, $$P(S|W) = \prod_{i=1}^{n} P(S_i|W_i) \times a^{m-n} \quad (8)$$

where $S_i$ refers to the ith letter of word entered by the user, and $W_i$ refers to the ith letter of W in the dictionary with length between S and (S+8). The maximum length limit of 8 is arbitrary and may be chosen according to testing. Finally, α refers to the penalty preventing long words with high frequency of being ranked high, and m is the length of W, wherein m≥n. α can be set to 0.7, thereby yielding the best compromise between the aggressiveness and candidate coverage for the TipText system.

In view of the above, and having generated the ranked list of candidate words at step 530 of method 510, the user can be engaged during sub process 535 of method 510.

At step 536 of sub process 535, the ranked list of candidate words can be received. At step 537 of sub process 535, a first candidate word, or present candidate word, can be displayed to the user via a display of the TipText system. As described above, the display of the TipText system may be on a wearable device such as smart glasses or a smart watch. The user may indicate by haptic feedback, in the word selection mode, whether the present candidate word is a word that was intended to be conveyed. The haptic feedback regarding the present candidate word can be received at step 538 of sub process 535. If the received haptic feedback indicates the present candidate word is the intended word, sub process 535 continues to step 539 and the intended word, or selected word, is saved in a buffer in preparation for appendage to an present sentence structure. Alternatively, if the received haptic feedback at step 538 of sub process 535 indicates the present candidate word is not the intended word, sub process 535 of method 510 returns to step 537 and a subsequent candidate word can be displayed, as the present candidate word, to the user for evaluation. As the candidate words are in a ranked list, the subsequent candidate word can be the next lower ranked candidate word within the ranked list. Nevertheless, upon receiving haptic input at step 538 of sub process 535 that the present candidate word is the intended word, sub process 535 of method 510 can proceed to step 539 and the selected word can be saved in a buffer for appendage to the present sentence structure.

According to an embodiment of the present disclosure, the haptic inputs received at step 538 of sub process 510 may be generated by different actions of the user relative to the QWERTY keyboard. For instance, the user may swipe a thumb across the QWERTY keyboard in order to indicate a present haptic input session is complete and the word selection mode is ready to be entered. In an example, the selection mode can be entered by swiping right across the QWERTY keyboard. In the word selection mode, the user can determine whether the present candidate word, or in the case of the initial candidate word, the highest ranked candidate word, is the intended word. If the user determines the present candidate word is the intended word, the user can proceed with the next word in a sentence, tapping "keys" of the QWERTY keyboard that correspond to a subsequent intended word of the sentence. In an embodiment, a space will be automatically inserted after the present candidate word becomes 'committed' by user tapping of the subsequent intended word. If, alternatively, the user determines the present candidate word is not the intended word, the user can, again, swipe across the QWERTY keyboard in order to summon the next candidate word from the ranked list of candidate words. In an example, the next candidate word can be summoned by swiping right across the QWERTY keyboard.

The real-word utility and applicability of the above-described TipText system will now be demonstrated with reference to non-limiting experimental design and experimental results.

Non-Limiting Experimental Results

According to an embodiment, two options were considered in designing a usable keyboard layout for the TipText system. A first option is to directly adopt a layout with 26 keys. Although keys will be extremely hard to select correctly, the intuition is that the statistical decoder may tolerate many, if not all, of the tapping errors, as shown previously for larger devices like smart watches and smartphones. A second option is to incorporate a larger size but smaller number of keys in a grid layout, similar to a T9 or a 1-line keyboard. The benefit of this option is that keys are larger, thus making it easier to acquire a signal. Ambiguity, however, may become an issue as each key is associated with more than one letter. Each option was explored.

(i) Study One

Study One was conducted to explore the feasibility of directly adopting a layout with 26 keys, in which data were collected reflecting eyes-free typing behaviors on a miniature QWERTY keyboard. The goal thereof was to collect data to understand eyes-free typing using the thumb-tip on a keyboard with 26 keys, thereby informing final keyboard design. Another motivation was to determine whether it is feasible for users to perform text entry based on their natural spatial awareness of a QWERTY layout, without practicing ahead of time on locations of keys. 10 right-handed participants (4 female) aged between 20 and 26 were recruited to participate in the study. The study was conducted with the Vicon motion tracking system for finger tracking with 1 mm accuracy and the Unity 2018.3.5f1 game engine for real-time physical touch estimation. Interactive skin to sense user input, as described above with reference to FIG. 3A through FIG. 3C, was intentionally not implemented in an effort to minimize sensor influence on user spatial awareness of key locations, as studies have found that user spatial acuity and sensitivity can be affected by the presence of the epidermal sensor.

Figure 6C:
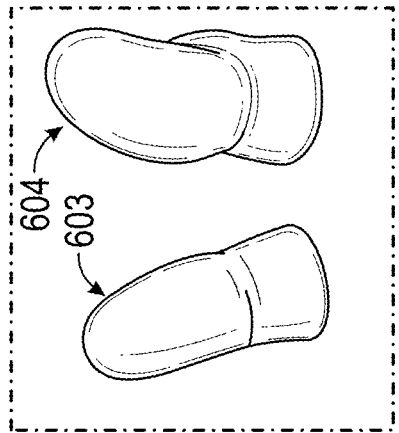
FIG. 6C is an image of clay models of fingers of a user that have been used for three-dimensional scanning, according to an exemplary embodiment of the present disclosure.
Figure 6B:
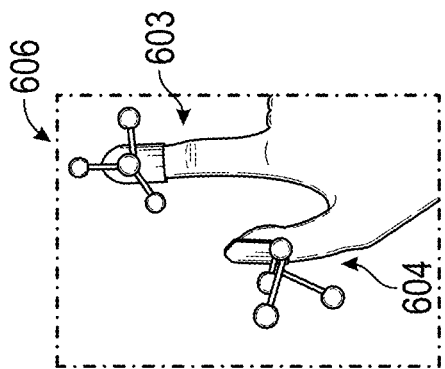
FIG. 6B is an image of markers attached to fingers of a user, according to an exemplary embodiment of the present disclosure.
Figure 6A:
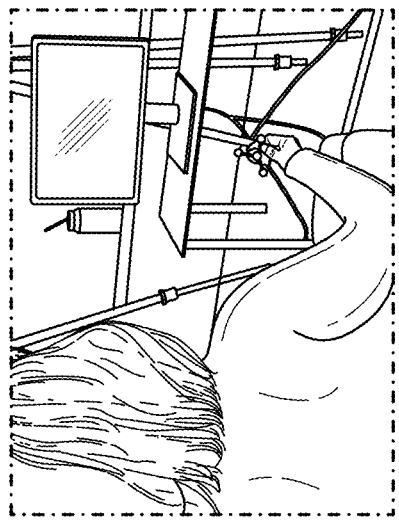
FIG. 6A is an image of a user typing in front of a monitor surrounded by 5 Vicon cameras via eyes-free one-handed text entry, according to an exemplary embodiment of the present disclosure.

With reference now to FIG. 6A, markers were attached on the nail of the thumb and index finger. As shown in FIG. 2B, markers 606 were attached to the nail of a thumb 604 and to the nail of an index finger 603 in order to obtain precise thumb-tip touch locations on the index finger 603. A Vicon motion tracking system, including the tripods of FIG. 6A, was then able to track movements and orientation of the first segments of the thumb 604 and the index finger 603 of the user. Though it can be appreciated the motion tracking data can be acquired by another similar system, the data from Vicon was then used to control movement of each finger within a three-dimensional (3D) environment, wherein each finger has a 3D virtual representation. The virtual fingers were high-resolution 3D meshes of the index finger 603 and the thumb 604 of the user obtained by scanning, using a topographical scanner, clay models of the index finger 603 and the thumb 604 of the user, as shown in FIG. 6C. In an example, a Roland Picza LPX-250RE laser scanner was used as the topographical scanner.

Three meshes were used for real-time physical simulation during the study. It was observed that people used different thumb regions (e.g. thumb tip, side of the thumb) to perform touch input on the index finger. Accordingly, participants were allowed to tap using different regions of the thumb to preserve a natural and comfortable interaction. With reference to FIG. 7, when a thumb 704 was in contact with an index finger 703, a collision of the 3D finger meshes could be detected at a touch point 753. Ideally, the 3D meshes should deform accordingly to reflect the deformation, in practice, of the skin of the fingertips. In the simulation, such collisions were allowed to penetrate for the sake of simplicity. The touch point 753 in a 3D space was estimated using the center of a contact area between the meshes calculated using a mesh intersection algorithm. A touch event was registered based upon the size of the intersection exceeding a threshold value. The 3D touch point 753 was then projected to a virtual plane perpendicular to the index finger surface, representing a 2D keyboard. Since fingers of each participant were different in size and shape, their fingers were manually measured and a corresponding plane for each participant to fit the first segment of the index finger 703 was transformed, accordingly. The projection point, or touch point 753, captured using the local coordinate system of that plane, can be used as input of a participant. It can be appreciated that, while the estimation of tap location may not reflect the real sensor data from the interactive skin, it provided a reasonable estimate to inform the design of the keyboard layout.

Figure 8:
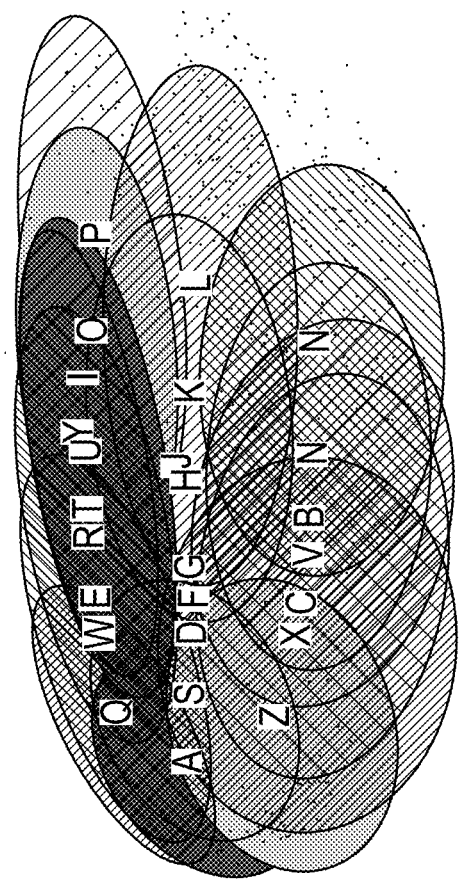
FIG. 8 is a series of scatter plots with 95% confidence ellipses of touch points in a 26 key QWERTY keyboard layout, according to an exemplary embodiment of the present disclosure.

During evaluation, eyes-free thumb-tip text entry tasks were performed with four blocks of ten phrases using a Wizard of Oz keyboard (e.g., no real keyboard was involved). The phrases were picked randomly from MacKenzie's phrase set. The same set of 40 phrases was used for all the participants. For each letter, participants tapped on an imaginary key location on the first segment of the index finger using the thumb-tip of their dominant hand based on their natural spatial awareness. They were asked to perform the task using their dominant hand as naturally as possible and assume that the keyboard would correct input errors. Our system always displayed the correct letters no matter where they tapped. In a few cases, however, users accidentally touched the input area on the finger before they were ready to input a new letter. Accordingly, the user was afforded a left swipe gesture to delete the last letter and allow users to correct these errors. After entering a phrase, participants pressed a "Done" button to proceed to the next phrase. This process was repeated until they completed all phrases. Participants were encouraged to take a short break between blocks. During the study, a monitor was placed in front of the participant to display the task. A static image of a QWERTY keyboard was also shown on the monitor to remind participants about the positions of keys. Participants sat in a chair with their dominant hand placed on the armrest and out of sight of the participant. Their finger could face any comfortable orientation. An experimenter sat beside them to ensure that their attention was on the monitor. Prior to the study, the system was calibrated for each participant to ensure that the fingers and their virtual representations in the 3D space were well aligned with each other. Before the study, participants were given a brief period of time to familiarize themselves with the system without practicing locations of keys. Touch points were recorded according to the local coordinates of 2D planes, which varied from user to user, and were normalized to obtain a general distribution. Touch points from ten participants, presented as scatter plots of touch points on a 26 key QWERTY keyboard, are shown in FIG. 8. The touch locations for different keys are shown in different hues. The corresponding letters are shown at centroids of the touch points along with a 95% confidence ellipse. It can be appreciated, that upon visual evaluation, touch locations are noisy with considerable overlaps among different ellipses, suggesting that eyes-free typing on a miniature fingertip keyboard with 26 keys is imprecise. However, it is still observable that centroids of user touch points for 26 keys form a QWERTY layout, except that some keys do not clearly separate apart from each other. For example, "Y" and "U" almost overlap. A language model may be helpful in this case. The above results demonstrate that, though the keys may be small, there is still a chance that participants might be able to type on a keyboard of 26 keys on the tip of the finger with the help of a statistical decoder. A general spatial model for this keyboard was derived from the collected data and used, subsequently, to compare the 26 key QWERTY keyboard with other approaches.

(i) Study Two

Study Two was conducted to explore the feasibility of incorporating a larger size keyboard but with fewer keys in a grid layout. In this layout, keys are larger in size to facilitate tapping but fewer in quantity in order to fit into the same rectangular input space of the QWERTY keyboard. The results of this approach can be compared against the 26 key QWERTY keyboard of Study One. Note that larger keys mean that each key may be associated with more than one letter. As such, user input may become ambiguous as it is unclear which letter is the target of the user. Therefore, a challenge of this approach is to find a keyboard layout that can best balance tapping precision and input ambiguities best.

There are 1,146,484 possible arrangements of a gridded rectangular space of a keyboard and assignments of 26 letters to each key per grid design. Accordingly, the theoretical performance of all possible arrangements was considered, For each candidate keyboard design, a simulation first calculated the key entries per target word and then found a list of words that exactly matched the key entries due to input ambiguities. If the list existed with more than one word, it was ordered by word frequency. No spatial information was involved at this step. The system recorded whether the target word appeared in the top three entries of the list. This approach repeated until it finished all the test words picked from a corpus. The test words may be, in an example, the top 15,000 words from the American National Corpus, covering over 95% of common English words. The percentage of times when the target word appeared in the top three entries of the list was calculated as word dis-ambiguity scores for the given keyboard design.

As mentioned above, only the language model was used in the simulation test since the spatial model of a statistical decoder cannot be acquired without a user study. Accordingly, assuming that no tapping errors exist, performance of the best candidate keyboard design is bounded by P(W), as the spatial mode P(S|W) is 1 in this scenario. Therefore, the assumption of this comparison test is that tapping errors do not exist regardless of how small the keys are. In another embodiment, this can be corrected by incorporating heuristics, where top ranked candidates also needed to have large keys.

After the simulator evaluated each of the possible keyboard designs that confined to the QWERTY's alphabetical arrangement, the arrangements which received a word disambiguation score higher than 90% were selected. These designs included keyboards ranging from one row to three rows, among which, the ones with the least number of keys were selected, thereby striking a balance between key size and word disambiguity. The remaining 162,972 candidates had a keyboard design in one of a 1×5 grid, a 2×3 grid, or a 3×2 grid. The keyboard layout of the top ranked design, which received a word disambiguity score of 94.6%, is shown in FIG. 43. This score represents the theoretical upper bound of all possible designs in these three grids, Note that an issue with this design is that many letters are shifted away from their original locations. For example, "G" and "V" are both in the horizontal center of a QWERTY keyboard, but now neither of them resides inside the middle key in the second row. This is due to the result of maximizing word disambiguity. The trade-off is learnability as people can no longer rely on their existing knowledge of the layout of a QWERTY keyboard. Instead, new letter locations will have to be learned upon initiating eyes-free typing. An extra design criterion was thus considered, which restricted letter assignments to follow their original locations strictly unless the letter resides at the boundary of two keys (e.g., "G" originally resides on the boundary of the two keys in the second row under a 3×2 grid). In this case, the possibilities for the letter to be assigned to either key were considered. By applying this rule, only 50 qualified out of all 162,972 candidates. This included 16 for the 1×5 grid, 32 for the 2×3 grid, and 2 for the 3×2 grid.

Subsequently, an understanding of user natural spatial awareness of key locations in these three grid layouts was obtained. Specifically, the understanding included knowing how grids differ with regard to tapping precision. The answer to these questions aided in the derivation of a spatial model for each of the three candidate grid layouts, which could be used to form a complete statistical decoder with the language model to estimate the performance of the different keyboard designs associated with these grids.

Accordingly, as a goal of Study Two, a spatial model for each of these three grid layouts was derived. Initially, the assignment of 26 letters to grid keys was yet to be determined and, therefore, the text entry task was replaced by a target acquisition task in which participants were instructed to acquire cells in a grid. As such, the spatial models obtained from Study Two served as a close approximation of the spatial models for acquiring keyboard keys, which were identical in size and location as the grid cells. 12 right-handed participants (4 female) aged from 20 to 26, for counterbalancing grid conditions, were recruited. The apparatus of Study One (i.e., FIG. 6A through FIG. 6C) was used in Study Two.

During Study Two, participants were required to select a target cell in one of the three tested grid layouts by tapping somewhere on the first segment of the index finger using the thumb-tip of their dominant hand. Because letter assignment was not considered, targets were generated in a random order instead of following a corpus. The grid layouts were introduced to participants by an experimenter describing the number of rows and columns. During the study, no visual grid layout was shown to the user. Instead the target was indicated by row and column number to avoid influencing tapping behaviors of each participant. Participants were asked to perform the task using their dominant hand as fast and as accurately as possible without looking at their fingers. Upon the end of a trial, a new target appeared. This process was repeated until participants completed all trials. Prior to the study, participants were given a brief period of time (e.g. 5 to 10 minutes) to familiarize themselves with the system and the representation of location in row and column number.

Figure 9C:
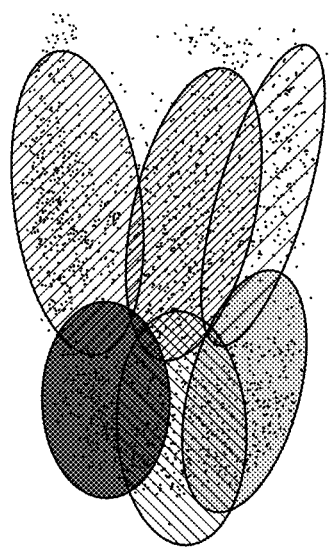
FIG. 9C is a scatter plot with 95% confidence ellipses of touch points in a keyboard layout, according to an exemplary embodiment of the present disclosure.
Figure 9B:
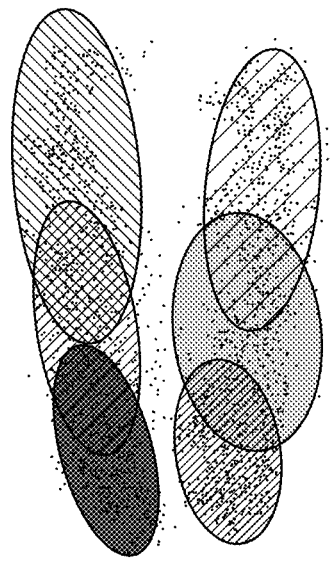
FIG. 9B is a scatter plot with 95% confidence ellipses of touch points in a keyboard layout, according to an exemplary embodiment of the present disclosure.
Figure 9A:
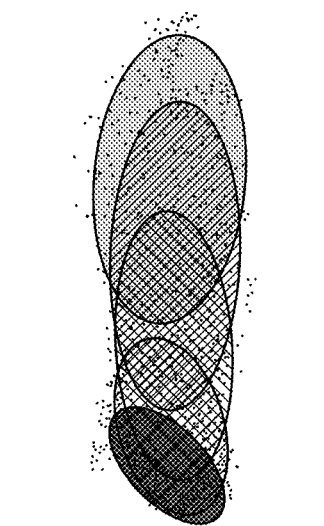
FIG. 9A is a scatter plot with 95% confidence ellipses of touch points in a keyboard layout, according to an exemplary embodiment of the present disclosure.

Study Two employed three grid layout conditions: 1×5, 2×3, and 3×2. The order of the three conditions was counterbalanced among participants and the target location was presented randomly. Each target in a grid repeated 50 times. FIG. 9A through FIG. 9C show the distributions of all touch points from 12 participants for each of three grid layouts. The touch locations for different cells are shown in different hues. The centroids of points for all cells and the 95% confidence ellipses are also shown. As expected, the touch locations are less noisy than on the QWERTY layout with 26 keys (i.e., Study One). There is, however, still overlap among the ellipses for all three grids. This suggests that tapping on the tested grid layouts based on participant imagination and spatial awareness is still inaccurate, to an extent. Separation of the touch points, however, is improved. Among the three tested grids, less overlap was observed on the 2×3 and 3×2 grids than on the 1×5 grid, possibly due to the cells of these grids being wider. It can be noted that centroids of touch points are all well separated for all three grids, following the same geometry of the three tested grids and suggesting that participants were able to identify the location of the grid cells using spatial awareness without looking at their fingers. Although tapping precision tended to be low, a keyboard decoder would be expected to tolerate the errors. A general spatial model was derived for each grid layout using the data collected in Study Two. The spatial model and the language model were used to form a statistical decoder, which was used subsequently to identify the most suitable keyboard design for the TipText system. 100981 With the general statistical decoders obtained for the keyboard with 26 keys (default keyboard) and the three grid layouts, another simulation was conducted, in which text entry on the default keyboard by the 10 participants from Study One and on the 50 grid candidates by the 12 participants from Study Two was simulated. It was assumed that typing using the TipText system is similar to typing on a soft keyboard in that user touch locations follow a bivariate Gaussian distribution. Therefore, the location of the user touch input was generated based on the bivariate Gaussian distribution of the individual spatial model. For each target word, the generated touch points served as input for the statistical decoder and the simulation checked whether the target word appeared in the top three entries of the list. The process was repeated similarly to the first simulation. As the touch points generated from different participant models are different, the word disambiguity scores for each candidate keyboard layout differed among participants. Therefore, an average score was calculated to represent the performance of each candidate. The default keyboard received an average score of 71.6%. On the other hand, among the 50 grid layout candidates, 10 grid layouts had a disambiguity score above 80%. All grid layouts were in a 2×3 grid. The top ranked layout, shown in FIG. 10A, scored an average of 82.38%. It was also the one scored the highest by 9 out of 12 participants. The winning layout outperformed the one ranked the lowest, shown in FIG. 10B, by 45.83%, It also outperformed the default layout by 10.78%. Therefore, the grid layout of FIG. 10A was used for the TipText system.

(iii) Study Three

Figure 11:
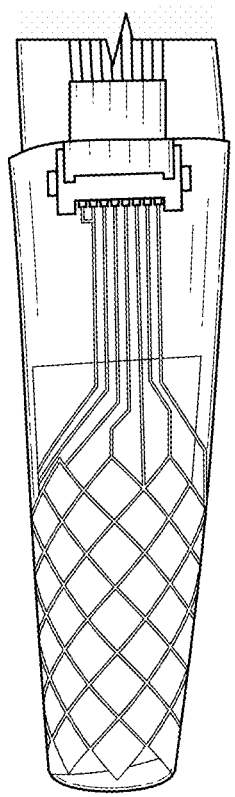
FIG. 11 is an image of a keyboard implemented within a system for eyes-free one-handed text entry, according to an exemplary embodiment of the present disclosure.

In view of the above selected grid layout of FIG. 10A, an interactive skin overlay for the TipText system was developed. In an exemplary embodiment, the thin and flexible device measures ~2.2 cm×2.2 cm and contains a printed 3×3 capacitive touch sensor matrix. The sensor features diamond shaped electrodes of 5 mm diameter and 6.5 mm center-to-center spacing. The interactive skin overlay featured a flexible printed circuit, as shown in FIG. 11, thereby providing more reliable readings on sensor data. Such flexible printed circuit measured 0.025-0.125 mm thick and 21.5 mm×27 mm wide.

The finished sensor was controlled using an Arduino Nano with a MPR121 touch sensing chip. The raw capacitive data from each channel was transmitted at a frequency of 100 Hz. Software that interpolates the electrode data was implemented in C#. Of course, it can be appreciated that software and hardware of the device of FIG. 13 would be similarly capable of performing the methods described herein.

In evaluating the TipText system implementing the flexible circuit board of FIG. 11, a user study was conducted to evaluate performance. Such study also allowed for measurement of how well the selected keyboard design worked on a state-of-the-art micro thumb-tip gesture sensor. 12 right-handed participants (2 female) aged between 20 and 27 were recruited, each participant being previously familiar with the QWERTY keyboard. The study was conducted using the interactive skin prototype of FIG. 11, developed using flexible printed circuit. During the study, participants sat in a chair and placed their hands similarly to that of Study One described herein. An experimenter sat beside the participant to ensure that the attention of the participant was on the monitor. Test phrases and top three candidates were shown on a monitor placed at a comfortable distance from the participant which simulated the situation where a near-eye display is available to the user. Swipe gestures were used to allow participants to navigate the candidate list and delete the last entered letter. A static image of the keyboard was shown on the monitor to remind participants about the positions of keys during training while it was hidden during the study.

The touch sensor of the interactive skin of the TipText system was calibrated for each participant prior to the study by having them tap three edge locations on the first segment of the index finger (e.g., tip and the two ends of the edge of the segment). This was to ensure that the sensor readings of the interactive skin were largely aligned with the spatial model previously obtained. Prior to the experiment, participants were allowed to practice at their discretion. During the study, participants transcribed 4 blocks, each containing 10 phrases picked randomly from MacKenzie's phrase set. The same set of 40 phrases was used for all participants. No phrase was repeated. After entering a phrase, participants pressed the button of a mouse placed on a table with their non-wearing hands to proceed to the next phrase. This process was repeated until they completed all the phrases. The experimental session lasted approximately 40 minutes, depending on participant speed. 480 phrases (12 participants×4 blocks×10 phrases) were collected in the study.

The resulting data were analyzed using one-way repeated measures ANOVA and Bonferroni corrections for pair-wise comparisons. For violations to sphericity, we used a Greenhouse-Geisser adjustment for degrees of freedom. ANOVA yielded a significant effect of Block ($F(3)=20.529$, $p<0.001$). The average text entry speed was 11.9 WPM (standard error of 0.5). FIG. 12A is a graphical illustration of the mean WPM by block, demonstrating a performance improvement with practice. For instance, post-hoc pair-wise comparisons showed a significant difference between first and second block ($p<0.05$). To this end, participants achieved 10.5 WPM (standard error of 0.6) in the first block and the speed increased to 13.3 WPM (standard error of 0.5) in the last block with an improvement of 27%. Accordingly, it can be said that participants were able to achieve a fairly good speed even in the first block, suggesting that participants were able to pick up text entry via the TipText system relatively quickly. Error rate is reported based on uncorrected error rate (UER) and total error rate (TER), shown in FIG. 12B. Uncorrected errors were the errors found in the final input phrases whereas total errors included both corrected and uncorrected errors. ANOVA yielded a significance effect of Block on TER ($F(3)=4.986$, $p<0.01$). Typing speed increased with the decrease in errors. This suggests that correcting errors was the major source that prevented participants from typing faster, though participants were generally able to identify errors and correct them. This is based on no significant effect of Block on UER ($F(3)=2.396$, $p>0.05$). Overall, the average TER and UER was 4.89% (standard error of 0.66%) and 0.30% (standard error of 0.33%) respectively. Noted above, FIG. 12B shows TER and UER by block. The average TER in the first block was 6.75% (standard error of and it improved significantly in the last block (3.88%, standard error of 0.53%). The average UER was 0.30% (standard error of 0.33%), which did not change significantly across all blocks. This suggests that when a target word fell outside of the top three suggestions, participants tended to delete the word and retype instead of exploring further down the list even if the candidate was sometimes only a swipe away. This provides some insight as to the optimal number of candidate words that should be shown.

Auto-complete rate of a word was calculated by dividing the number of automatically filled letters by the length of that word. The overall auto-complete rate was thus the mean of the auto-complete rate of all tested words. Overall, the auto-complete rate was 14.91% (standard error of 2.39%) for all the input words across all four blocks. We found that text entry speed without auto-complete on Block 4 was 13.3×(100%−14.91%)=11.3 WPM. There was no significant effect of Block on auto-complete ($F(3)=2.406$, $p>0.05$). Over the four blocks, the mean standard deviation was 0.74%. This suggested that participants used auto-complete consistently throughout even getting more familiar with the keyboard layout.

With regard to text entry speed and error rate, the average speed of text entry via the TipText system was 11.9 WPM, though participants were able to achieve 13.3 WPM in the last block. This is faster than the existing finger-based one-handed text-entry technique, FingerT9 (5.42 WPM), which uses the entire body of all four fingers as the input space for a keypad. The performance of text entry via the TipText system is also comparable with DigiTouch, a bimanual text entry technique using the fingers of both hands (average 13 WPM). In the context of mobile scenarios, the TipText system has the advantage of freeing the other hand of the user for other tasks, such as carrying shopping bags. As participants were able to pick up text entry via the TipText system quickly and without seeing a keyboard, the TipText system might be a good option for ultra-small devices without a screen. Further, these results show an improving trend for speed, suggesting that expert performance could be even higher and, thus, warrant a longer-term study. Accordingly, future research should consider the upper boundary of text entry input speed via the TipText system.

With regard to the number of suggestions, and considering that the number of suggestions could affect the layout performance because searching through the candidate word list requires extra cognitive effort and visual attention, the present disclosure considered presentation of three candidate words. However, since the TipText system was designed to avoid showing an on-screen keyboard on a small computing device (e.g., a smart watch or smart glasses), it is thus possible that more than three candidate words can be shown to the user. Further research should consider how the number of suggestions may affect typing performance and whether an optimal number of suggestions exist for a general population.

With regard to the statistical decoder, the present disclosure describes a statistical decoder derived from the general spatial data collected from twelve participants. The bivariate Gaussian distributions vary among different users and a personalized keyboard decoder can theoretically improve typing performance for each individual. In an embodiment, an adaptive algorithm that can effectively shift the model from general to personal may be developed. Additionally, it may be important to further investigate adaptive algorithms that can dynamically update the statistical decoder according to instantaneous and historical input from each user, as tapping behaviors of each user may vary with different hand postures and contexts such as standing and walking.

According to an embodiment, the present disclosure describes a micro thumb-tip text entry technique based on a miniature invisible keyboard residing invisibly on the first segment of the index finger. The miniature invisible keyboard optimizes layout learnability, key size, and word dis-ambiguity, and includes a 23 grid layout with the letters highly confining to the alphabetic and spatial arrangement of QWERTY. The design of this keyboard was optimized for eves-free input by utilizing a spatial model reflecting users' natural spatial awareness of key locations on the index finger so the user does not need to look at the keyboard when typing. It is anticipated that micro finger gesture typing has many applications, ranging from mobile, wearable, and AR.

Figure 13:
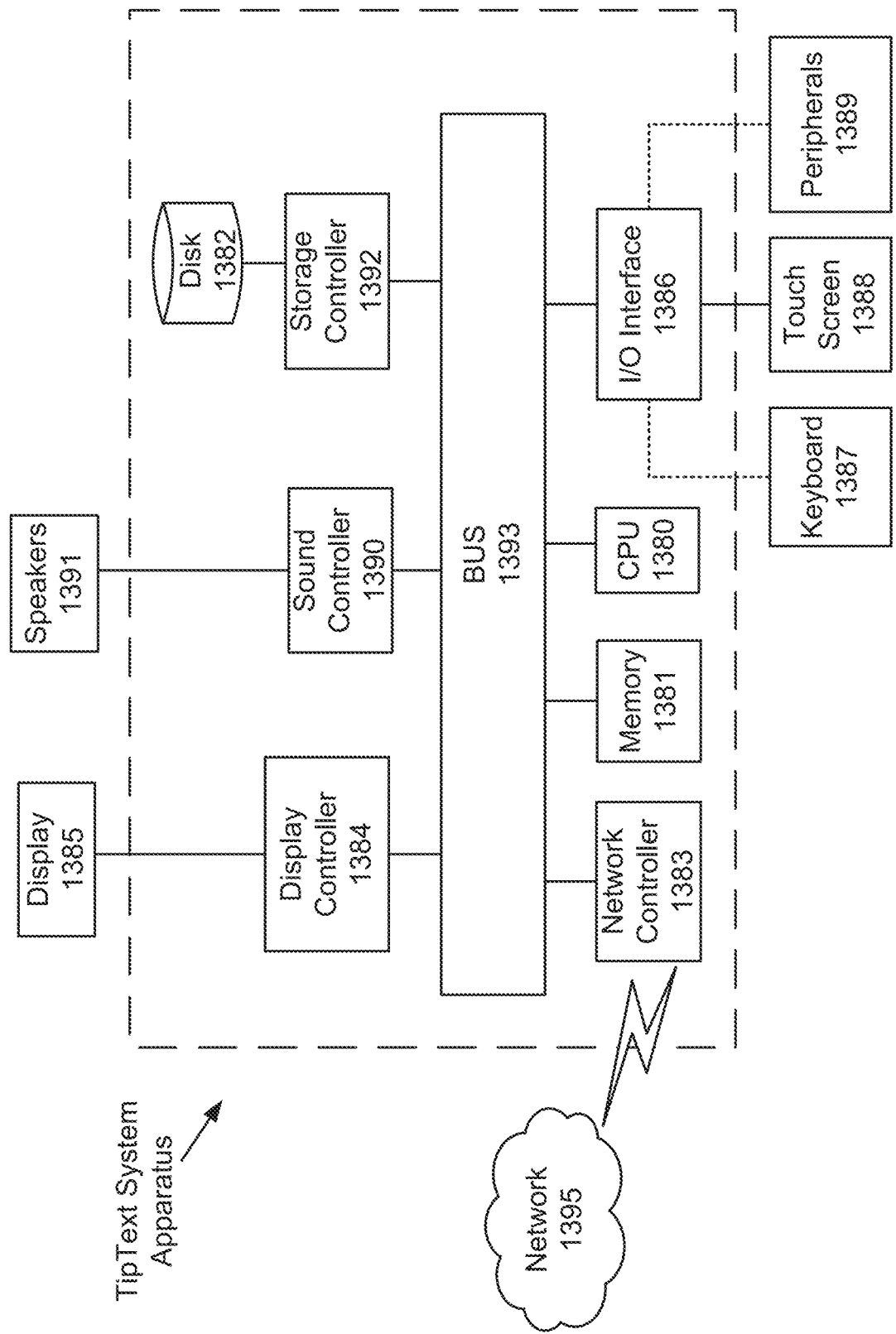
FIG. 13 is a hardware configuration of a computer integrally-formed or in communication with an apparatus of a system for eyes-free one-handed text entry, according to an exemplary embodiment of the present disclosure.

Next, a hardware description of an apparatus of the TipText system, according to exemplary embodiments, is described with reference to FIG. 13. In FIG. 13, the apparatus of the TipText system may be a wearable device, such as a smart watch or smart glasses, and the computational resources of the wearable device, in communication with an interactive skin of the TipText system arranged on the finger of the user, may be exploited in order to perform the methods of the TipText system described above. To this end, the apparatus of the TipText system includes a CPU 1380 which performs the processes described above/below. The process data and instructions may be stored in memory 1381. These processes and instructions may also be stored on a storage medium disk 1382 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the apparatus of the TipText system communicates, such as a server or computer.

Further, the claimed advancements may be provided as a utility application, background daemon, or component of an operating system, or combination thereof, executing in conjunction with CPU 1380 and an operating system such as Microsoft Windows 7, UNIX, Solaris, LINUX, Apple MAC-OS and other systems known to those skilled in the art.

The hardware elements in order to achieve the apparatus of the TipText system may be realized by various circuitry elements, known to those skilled in the art. For example, CPU 1380 may be a Xenon or Core processor from Intel of America or an Opteron processor from AMD of America, or may be other processor types that would be recognized by one of ordinary skill in the art. Alternatively, the CPU 1380 may be implemented on an FPGA, ASIC, PLD or using discrete logic circuits, as one of ordinary skill in the art would recognize, Further, CPU 1380 may be implemented as multiple processors cooperatively working in parallel to perform the instructions of the inventive processes described above.

The apparatus of the TipText system in FIG. 13 also includes a network controller 1383, such as an Intel Ethernet PRO network interface card from Intel Corporation of America, for interfacing with network 1395. As can be appreciated, the network 1395 can be a public network, such as the Internet, or a private network such as an LAN or WAN network, or any combination thereof and can also include PSTN or ISDN sub-networks. The network 1395 can also be wired, such as an Ethernet network, or can be wireless such as a cellular network including EDGE, 3G and 4G wireless cellular systems. The wireless network can also be WiFi, Bluetooth, or any other wireless form of communication that is known.

The apparatus of the TipText system further includes a display controller 1384, such as a NVIDIA GeForce GTX or Quadro graphics adaptor from NVIDIA Corporation of America for interfacing with display 1384, such as a Hewlett Packard HPL2445w CD monitor. In an embodiment, the display 1384 may be a display of the wearable device, such as a smart watch or smart glasses, and may be used for displaying the ranked list of candidate words. A general purpose I/O interface 1386 interfaces with a keyboard 1387 as well as a touch screen panel 1388 on or separate from display 1385. In an embodiment, the keyboard 1387 may be a QWERTY keyboard integrated within an interactive skin of the TipText system. The keyboard 1387 may be in wired or wireless communication with the general purpose I/O interface 1386. General purpose I/O interface 1386 also connects to a variety of peripherals 1389. The peripherals 1389 may include certain other aspects of the interactive skin of the TipText system of the present disclosure, independently or in combination with the above-described features. For instance, the peripherals 1389 may include supplemental controls to enable wired or wireless interaction with the tactile sensors of the QWERTY keyboard.

A sound controller 1390 is also provided in the apparatus of the TipText system, such as Sound. Blaster X-Fi Titanium from Creative, to interface with speakers/microphone 1391 thereby providing sounds and/or music.

The general purpose storage controller 1392 connects the storage medium disk 1382 with communication bus 1393, which may be an ISA, EISA, VESA, PCI, or similar, for interconnecting all of the components of the apparatus of the TipText system. A description of the general features and functionality of the display 1385, keyboard 1387, as well as the display controller 1384, storage controller 1392, network controller 1383, sound controller 1390, and general purpose I/O interface 1386 is omitted herein for brevity as these features are known.

Figure 14:
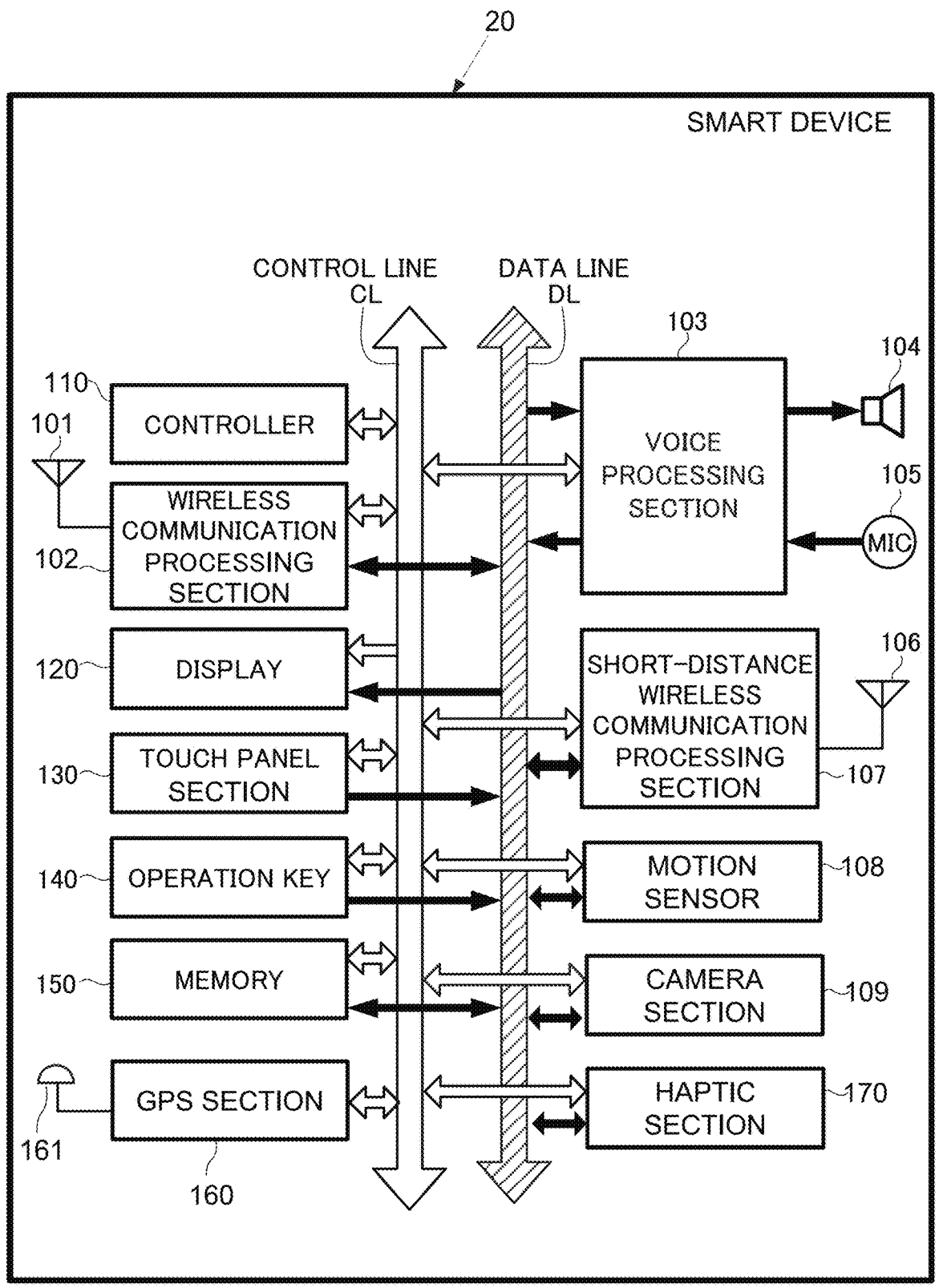
FIG. 14 is a hardware configuration of an apparatus, such as a wearable device, having computational resources for performing methods of the system for eyes-free one-handed text entry, according to an exemplary embodiment of the present disclosure.

According to an embodiment, the apparatus of the present disclosure is a smart device, such as smart glasses or a smart watch. FIG. 14 is a more detailed block diagram illustrating a smart device 20, an exemplary user device 20, according to certain embodiments of the present disclosure. In certain embodiments, user device 20 may be a smartphone. However, the skilled artisan will appreciate that the features described herein may be adapted to be implemented on other devices (e.g., a laptop, a tablet, a server, an e-reader, a camera, a navigation device, a smart watch, a smart glasses, etc.). The exemplary user device 20 of FIG. 14 includes a controller 110 and a wireless communication processor 102 connected to an antenna 101. A speaker 104 and a microphone 105 are connected to a voice processor 103.

The controller 110 is an example of the control unit 21 and may include one or more Central Processing Units (CPUs), and may control each element in the user device 20 to perform functions related to communication control, audio signal processing, control for the audio signal processing, still and moving image processing and control, and other kinds of signal processing. The controller 110 may perform these functions by executing instructions stored in a memory 150. Alternatively or in addition to the local storage of the memory 150, the functions may be executed using instructions stored on an external device accessed on a network or on a non-transitory computer readable medium.

The memory 150 includes but is not limited to Read Only Memory (ROM), Random Access Memory (RAM), or a memory array including a combination of volatile and non-volatile memory units. The memory 150 may be utilized as working memory by the controller 110 while executing the processes and algorithms of the present disclosure. Additionally, the memory 150 may be used for long-term storage, e.g., of image data and information related thereto.

The user device 20 includes a control line CL and data line DL as internal communication bus lines. Control data to/from the controller 110 may be transmitted through the control line CL. The data line DL may be used for transmission of voice data, display data, etc.

The antenna 101 transmits/receives electromagnetic wave signals between base stations for performing radio-based communication, such as the various forms of cellular telephone communication. The wireless communication processor 102 controls the communication performed between the user device 20 and other external devices via the antenna 101. For example, the wireless communication processor 102 may control communication between base stations for cellular phone communication.

The speaker 104 emits an audio signal corresponding to audio data supplied from the voice processor 103. The microphone 105 detects surrounding audio and converts the detected audio into an audio signal. The audio signal may then be output to the voice processor 103 for further processing. The voice processor 103 demodulates and/or decodes the audio data read from the memory 150 or audio data received by the wireless communication processor 102 and/or a short-distance wireless communication processor 107. Additionally, the voice processor 103 may decode audio signals obtained by the microphone 105.

The exemplary user device 20 may also include a display 120, a touch panel 130, an operation key 140, and a short-distance communication processor 107 connected to an antenna 106. The display 120 may be a Liquid Crystal Display (LCD), an organic electroluminescence display panel, or another display screen technology. In addition to displaying still and moving image data, the display 120 may display operational inputs, such as numbers or icons which may be used for control of the user device 20. The display 120 may additionally display a GUI for a user to control aspects of the user device 20 and/or other devices. Further, the display 120 may display characters and images received by the user device 20 in response to haptic inputs of a user via an interactive skin of the TipText system and/or stored in the memory 150 (i.e. buffer of selected words) or accessed from an external device on a network. For example, the user device 20 may access a network such as the Internet and display text and/or images transmitted from a Web server.

The touch panel 130 may include a physical touch panel display screen and a touch panel driver. The touch panel 130 may include one or more touch sensors for detecting an input operation on an operation surface of the touch panel display screen. The touch panel 130 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 130 may detect when the stylus approaches/contacts the operation surface of the touch panel display (similar to the case in which a finger is used for the touch operation).

In certain aspects of the present disclosure, the touch panel 130 may be disposed adjacent to the display 120 (e.g., laminated) or may be formed integrally with the display 120. For simplicity, the present disclosure assumes the touch panel 130 is formed integrally with the display 120 and therefore, examples discussed herein may describe touch operations being performed on the surface of the display 120 rather than the touch panel 130. However, the skilled artisan will appreciate that this is not limiting.

For simplicity, the present disclosure assumes the touch panel 130 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 130 may include transparent electrode touch sensors arranged in the X-Y direction on the surface of transparent sensor glass.

The touch panel driver may be included in the touch panel 130 for control processing related to the touch panel 130, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 130 may detect a position of a user's finger around an edge of the display panel 120 (e.g., gripping a protective case that surrounds the display/touch panel). Signals may be transmitted by the touch panel driver, e.g. in response to a detection of a touch operation, in response to a query from another element based on timed data exchange, etc.

The touch panel 130 and the display 120 may be surrounded by a protective casing, which may also enclose the other elements included in the user device 20. In certain embodiments, a position of the user's fingers on the protective casing (but not directly on the surface of the display 120) may be detected by the touch panel 130 sensors. Accordingly, the controller 110 may perform display control processing described herein based on the detected position of the user's fingers gripping the casing. For example, an element in an interface may be moved to a new location within the interface e.g., closer to one or more of the fingers) based on the detected finger position.

Further, in certain embodiments, the controller 110 may be configured to detect which hand is holding the user device 20, based on the detected finger position. For example, the touch panel 130 sensors may detect a plurality of fingers on the left side of the user device (e.g., on an edge of the display 120 or on the protective casing), and detect a single finger on the right side of the user device 20. In this exemplary scenario, the controller 110 may determine that the user is holding the user device 20 with his/her right hand because the detected grip pattern corresponds to an expected pattern when the user device 20 is held only with the right hand.

The operation key 140 may include one or more buttons or similar external control elements, which may generate an operation signal based on a detected input by the user. In addition to outputs from the touch panel 130, these operation signals may be supplied to the controller 110 for performing related processing and control. In certain aspects of the present disclosure, the processing and/or functions associated with external buttons and the like may be performed by the controller 110 in response to an input operation on the touch panel 130 display screen rather than the external button, key, etc. In this way, external buttons on the user device 20 may be eliminated in lieu of performing inputs via touch operations, thereby improving water-tightness.

The antenna 106 may transmit/receive electromagnetic wave signals to/from other external apparatuses, and the short-distance wireless communication processor 107 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 107.

The user device 20 may include a motion sensor 108. The motion sensor 108 may detect features of motion (i.e., one or more movements) of the user device 20. For example, the motion sensor 108 may include an accelerometer to detect acceleration, a gyroscope to detect angular velocity, a geomagnetic sensor to detect direction, a geo-location sensor to detect location, etc., or a combination thereof to detect motion of the user device 20. In certain embodiments, the motion sensor 108 may generate a detection signal that includes data representing the detected motion. For example, the motion sensor 108 may determine a number of distinct movements in a motion (e.g., from start of the series of movements to the stop, within a predetermined time interval, etc.), a number of physical shocks on the user device 20 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 110, whereby further processing may be performed based on data included in the detection signal. The motion sensor 108 can work in conjunction with a Global Positioning System (GPS) section 160. The GPS section 160 detects the present position of the terminal device 100. The information of the present position detected by the GPS section 160 is transmitted to the controller 110. An antenna 161 is connected to the GPS section 160 for receiving and transmitting signals to and from a GPS satellite.

The user device 20 may include a camera section 109, which includes a lens and shutter for capturing photographs of the surroundings around the user device 20. In an embodiment, the camera section 109 captures surroundings of an opposite side of the user device 20 from the user. The images of the captured photographs can be displayed on the display panel 120. A memory section saves the captured photographs. The memory section may reside within the camera section 109 or it may be part of the memory 150. The camera section 109 can be a separate feature attached to the user device 20 or it can be a built-in camera feature.

The user device 20 may include a haptic section 170, comprising processing circuitry and a tactile sensor and controller for detecting and receiving tactile interactions between a user and an interactive skin of the TypText system. In an embodiment, the haptic section 170 receives haptic input front the user and transmits data corresponding to the haptic input to other processors for evaluation and candidate word generation. In an embodiment, the haptic section 170 receives haptic input from the user and performs evaluation and candidate word generation locally.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A system for eyes-free text entry, comprising a wearable device having a display, and processing circuitry configured to receive a haptic input provided to a keyboard mounted on a finger of a user, the haptic input being an indication of an alphabetical letter determined based on a location of the haptic input on the keyboard, generate a list of candidate words based on the received haptic input, each candidate word of the list of candidate words being associated with a probability thereof, display the generated list of candidate words to the user via the display of the wearable device, receive a selection of a particular candidate word of the list of candidate words, and append the particular candidate word of the list of candidate words corresponding to the received selection to a present sentence structure, wherein the keyboard has a layout based on a spatial model reflecting spatial awareness, by the user, of key locations on the finger.

(2) The system according to (1), wherein the processing circuitry is configured to calculate the probability associated with each candidate word of the list of candidate words by generating a probability based on an application of the spatial model to the received haptic input, the spatial model describing a relationship between touch locations of the user and locations of keys of the keyboard, generating a probability based on an application of a language model to the received haptic input, the language model providing probability distributions of a sequence of words for a given language, and combining the generated probability based on the application of the spatial model and the generated probability based on the application of the language model to generate the probability associated with each candidate word of the list of candidate words.

(3) The system according to either (1) or (2), wherein the processing circuitry is further configured to rank each candidate word of the generated list of candidate words based on a respective probability of each candidate word.

(4) The system according to any one of (1) to (3), wherein the processing circuitry is further configured to receive a corrective haptic input to the keyboard indicating that a prior haptic input should be ignored, the corrective haptic input being a swipe of a thumb of the user.

(5) The system according to any one of (1) to (4), wherein the processing circuitry is further configured to receive a directive haptic input to the keyboard indicating that a candidate word of the generated list of candidate words is incorrect, the directive haptic input being a swipe of a thumb of the user.

(6) The system according to any one of (1) to (5), wherein the layout of the keyboard is a 2×3 grid and is based on QWERTY.

(7) The system according to any one of (1) to (6), wherein the keyboard is disposed within a flexible printed circuit.

(8) A method of eyes-free text entry, comprising receiving, by processing circuitry, a haptic input provided to a keyboard mounted on a finger of a user, the haptic input being an indication of an alphabetical letter determined based on a location of the haptic input on the keyboard, generating, by the processing circuitry, a list of candidate words based on the received haptic input, each candidate word of the list of candidate words being associated with a probability thereof, displaying, by the processing circuitry, the generated list of candidate words to the user via a display of a wearable device, receiving, by the processing circuitry, a selection of a particular candidate word of the list of candidate words, and appending, by the processing circuitry, the particular candidate word of the list of candidate words corresponding to the received selection to a present sentence structure, wherein the keyboard has a layout based on a spatial model reflecting spatial awareness, by the user, of key locations on the finger.

(9) The method according to (8), further comprising receiving, by the processing circuitry, a corrective haptic input to the keyboard indicating that a prior haptic input should be ignored, the corrective haptic input being a swipe of a thumb of the user.

(10) The method according to either (8) or (9), further comprising receiving, by the processing circuitry, a directive haptic input to the keyboard indicating that a candidate word of the generated list of candidate words is incorrect, the directive haptic input being a swipe of a thumb of the user.

(11) The method according to any one of (8) to (10), further comprising ranking, by the processing circuitry, each candidate word of the generated list of candidate words based on a respective probability of each candidate word.

(12) The method according to any one of (8) to (11), further comprising displaying, by the processing circuitry, a ranked candidate word of the generated list of candidate words to the user via the display of the wearable device.

(13) The method according to any one of (8) to (12), wherein the probability associated with each candidate word of the generated list of candidate words is calculated by generating, by the processing circuitry, a probability based on an application of the spatial model to the received haptic input, the spatial model describing a relationship between touch locations of the user and locations of keys of the keyboard, generating, by the processing circuitry, a probability based on an application of a language model to the received haptic input, the language model providing probability distributions of a sequence of words for a given language, and combining, by the processing circuitry, the generated probability based on the application of the spatial model and the generated probability based on the application of the language model to generate the probability associated with each candidate word of the list of candidate words.

(14) An apparatus for eyes-free text entry, comprising processing circuitry configured to receive a haptic input provided to a keyboard mounted on a finger of a user, the haptic input being an indication of an alphabetical letter determined based on a location of the haptic input on the keyboard, generate a list of candidate words based on the received haptic input, each candidate word of the list of candidate words being associated with a probability thereof, display the generated list of candidate words to the user via a display of a wearable device, receive a selection of a particular candidate word of the list of candidate words, and append the particular candidate word of the list of candidate words corresponding to the received selection to a present sentence structure, wherein the keyboard has a layout based on a spatial model reflecting spatial awareness, by the user, of key locations on the finger.

(15) The apparatus according to (14), wherein the processing circuitry is configured to calculate the probability associated with each candidate word of the list of candidate words by generating a probability based on an application of the spatial model to the received haptic input, the spatial model describing a relationship between touch locations of the user and locations of keys of the keyboard, generating a probability based on an application of a language model to the received haptic input, the language model providing probability distributions of a sequence of words for a given language, and combining the generated probability based on the application of the spatial model and the generated probability based on the application of the language model to generate the probability associated with each candidate word of the list of candidate words.

(16) The apparatus according to either (14) or (15), wherein the processing circuitry is further configured to rank each candidate word of the generated list of candidate words based on a respective probability of each candidate word.

(17) The apparatus according to any one of (14) to (16), wherein the processing circuitry is further configured to receive a corrective haptic input to the keyboard indicating that a prior haptic input should be ignored, the corrective haptic input being a swipe of a thumb of the user.

(18) The apparatus according to any one of (14) to (17), wherein the processing circuitry is further configured to receive a directive haptic input to the keyboard indicating that a candidate word of the generated list of candidate words is incorrect, the directive haptic input being a swipe of a thumb of the user.

(19) The apparatus according to any one of (14) to (18), wherein the layout of the keyboard is a 2×3 grid and is based on QWERTY.

(20) The apparatus according to any one of (14) to (19), wherein the keyboard is disposed within a flexible printed circuit.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for eyes-free text entry, comprising:
a wearable device having a display; and
processing circuitry configured to
receive a haptic input provided to a keyboard mounted on a finger of a user, the haptic input being an indication of an alphabetical letter determined based on a location of the haptic input on the keyboard,
generate a list of candidate words based on the received haptic input, each candidate word of the list of candidate words being associated with a probability thereof,
display the generated list of candidate words to the user via the display of the wearable device,
receive a selection of a particular candidate word of the list of candidate words, and
append the particular candidate word of the list of candidate words corresponding to the received selection to a present sentence structure,
wherein the keyboard has a layout based on a spatial model reflecting spatial awareness, by the user, of key locations on the finger.

2. The system according to claim 1, wherein the processing circuitry is configured to calculate the probability associated with each candidate word of the list of candidate words by
generating a probability based on an application of the spatial model to the received haptic input, the spatial model describing a relationship between touch locations of the user and locations of keys of the keyboard,
generating a probability based on an application of a language model to the received haptic input, the language model providing probability distributions of a sequence of words for a given language, and
combining the generated probability based on the application of the spatial model and the generated probability based on the application of the language model to generate the probability associated with each candidate word of the list of candidate words.

3. The system according to claim I, wherein the processing circuitry is further configured to
rank each candidate word of the generated list of candidate words based on a respective probability of each candidate word.

4. The system according to claim I, wherein the processing circuitry is further configured to
receive a corrective haptic input to the keyboard indicating that a prior haptic input should be ignored, the corrective haptic input being a swipe of a thumb of the user.

5. The system according to claim 1, wherein the processing circuitry is further configured to
receive a directive haptic input to the keyboard indicating that a candidate word of the generated list of candidate words is incorrect, the directive haptic input being a swipe of a thumb of the user.

6. The system according to claim 1, wherein the layout of the keyboard is a 2×3 grid and is based on QWERTY.

7. The system according to claim 1, wherein the keyboard is disposed within a flexible printed circuit.

8. A method of eyes-free text entry, comprising:
receiving, by processing circuitry, a haptic input provided to a keyboard mounted on a finger of a user, the haptic input being an indication of an alphabetical letter determined based on a location of the haptic input on the keyboard;
generating, by the processing circuitry, a list of candidate words based on the received haptic input, each candidate word of the list of candidate words being associated with a probability thereof;
displaying, by the processing circuitry, the generated list of candidate words to the user via a display of a wearable device;
receiving, by the processing circuitry, a selection of a particular candidate word of the list of candidate words; and
appending, by the processing circuitry, the particular candidate word of the list of candidate words corresponding to the received selection to a present sentence structure,
wherein the keyboard has a layout based on a spatial model reflecting spatial awareness, by the user, of key locations on the finger.

9. The method according to claim 8, further comprising
receiving, by the processing circuitry, a corrective haptic input to the keyboard indicating that a prior haptic input should be ignored, the corrective haptic input being a swipe of a thumb of the user.

10. The method according to claim 8, further comprising receiving, by the processing circuitry, a directive haptic input to the keyboard indicating that a candidate word of the generated list of candidate words is incorrect, the directive haptic input being a swipe of a thumb of the user.

11. The method according to claim 8, further comprising ranking, by the processing circuitry, each candidate word of the generated list of candidate words based on a respective probability of each candidate word.

12. The method according to claim 11, further comprising displaying, by the processing circuitry, a ranked candidate word of the generated list of candidate words to the user via the display of the wearable device.

13. The method according to claim 8, wherein the probability associated with each candidate word of the generated list of candidate words is calculated by
   generating, by the processing circuitry, a probability based on an application of the spatial model to the received haptic input, the spatial model describing a relationship between touch locations of the user and locations of keys of the keyboard,
   generating, by the processing circuitry, a probability based on an application of a language model to the received haptic input, the language model providing probability distributions of a sequence of words for a given language, and
   combining, by the processing circuitry, the generated probability based on the application of the spatial model and the generated probability based on the application of the language model to generate the probability associated with each candidate word of the list of candidate words.

14. An apparatus for eyes-free text entry, comprising: processing circuitry configured to
   receive a haptic input provided to a keyboard mounted on a finger of a user, the haptic input being an indication of an alphabetical letter determined based on a location of the haptic input on the keyboard;
   generate a list of candidate words based on the received haptic input, each candidate word of the list of candidate words being associated with a probability thereof;
   display the generated list of candidate words to the user via a display of a wearable device;
   receive a selection of a particular candidate word of the list of candidate words; and
   append the particular candidate word of the list of candidate words corresponding to the received selection to a present sentence structure,
   wherein the keyboard has a layout based on a spatial model reflecting spatial awareness, by the user, of key locations on the finger.

15. The apparatus according to claim 14, wherein the processing circuitry is configured to calculate the probability associated with each candidate word of the list of candidate words by
   generating a probability based on an application of the spatial model to the received haptic input, the spatial model describing a relationship between touch locations of the user and locations of keys of the keyboard,
   generating a probability based on an application of a language model to the received haptic input, the language model providing probability distributions of a sequence of words for a given language, and
   combining the generated probability based on the application of the spatial model and the generated probability based on the application of the language model to generate the probability associated with each candidate word of the list of candidate words.

16. The apparatus according to claim 14, wherein the processing circuitry is further configured to
   rank each candidate word of the generated list of candidate words based on a respective probability of each candidate word.

17. The apparatus according to claim 14, wherein the processing circuitry is further configured to
   receive a corrective haptic input to the keyboard indicating that a prior haptic input should be ignored, the corrective haptic input being a swipe of a thumb of the user.

18. The apparatus according to claim 14, wherein the processing circuitry is further configured to
   receive a directive haptic input to the keyboard indicating that a candidate word of the generated list of candidate words is incorrect, the directive haptic input being a swipe of a thumb of the user.

19. The apparatus according to claim 14, wherein the layout of the keyboard is a 2×3 grid and is based on QWERTY.

20. The apparatus according to claim 14, wherein the keyboard is disposed within a flexible printed circuit.

* * * * *